(12) United States Patent
Abhari et al.

(10) Patent No.: US 7,541,402 B2
(45) Date of Patent: *Jun. 2, 2009

(54) BLEND FUNCTIONALIZED POLYOLEFIN ADHESIVE

(75) Inventors: Ramin Abhari, Bixby, OK (US);
Charles Lewis Sims, Houston, TX (US);
Patrick Brant, Seabrook, TX (US);
Peijun Jiang, League City, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 361 days.

This patent is subject to a terminal disclaimer.

(21) Appl. No.: 10/825,635

(22) Filed: Apr. 15, 2004

(65) Prior Publication Data

US 2004/0220336 A1    Nov. 4, 2004

Related U.S. Application Data

(63) Continuation-in-part of application No. 10/686,951, filed on Oct. 15, 2003, and a continuation-in-part of application No. 10/687,508, filed on Oct. 15, 2003.

(60) Provisional application No. 60/418,482, filed on Oct. 15, 2002, provisional application No. 60/460,714, filed on Apr. 4, 2003.

(51) Int. Cl.
*C08L 51/00* (2006.01)

(52) U.S. Cl. .............. 524/272; 524/487; 524/488; 524/489

(58) Field of Classification Search ......... 524/487, 524/488, 489, 272, 495; 525/333.7
See application file for complete search history.

(56) References Cited

U.S. PATENT DOCUMENTS

| | | | |
|---|---|---|---|
| 1,953,104 A | 4/1934 | Hale-Church et al. | |
| 3,483,276 A | 12/1969 | Mahlman | 260/897 |
| 3,821,143 A | 6/1974 | Cluff et al. | |
| 3,954,697 A | 5/1976 | McConnell et al. | |
| 4,178,272 A | 12/1979 | Meyer, Jr. et al. | |
| 4,205,021 A | 5/1980 | Morita et al. | |
| 4,210,570 A | 7/1980 | Trotter et al. | 260/33.6 AQ |
| 4,217,428 A | 8/1980 | McConnell et al. | |
| 4,361,628 A | 11/1982 | Krueger et al. | 428/475.8 |
| 4,476,283 A | 10/1984 | Andersen | 525/53 |
| 4,496,698 A | 1/1985 | Adriaans et al. | |
| 4,510,286 A | 4/1985 | Liu | 525/71 |
| 4,525,469 A | 6/1985 | Ueda et al. | |
| 4,547,552 A | 10/1985 | Toyota et al. | |
| 4,600,648 A | 7/1986 | Yazaki et al. | 428/412 |
| 4,668,752 A | 5/1987 | Tominari et al. | |
| 4,668,753 A | 5/1987 | Kashiwa et al. | |
| 4,668,834 A | 5/1987 | Rim et al. | |
| 4,673,719 A | 6/1987 | Kioka et al. | |
| 4,675,247 A | 6/1987 | Kitamura et al. | |
| 4,701,432 A | 10/1987 | Welborn, Jr. | |
| 4,725,506 A | 2/1988 | Nagano | |
| 4,737,548 A | 4/1988 | Kojima et al. | |
| 4,751,121 A | 6/1988 | Kuhnel et al. | |
| 4,774,144 A | 9/1988 | Jachec et al. | |
| 4,794,096 A | 12/1988 | Ewen | |
| 4,822,688 A | 4/1989 | Nogues | 428/458 |
| 4,826,939 A | 5/1989 | Stuart, Jr. | |
| 4,837,271 A | 6/1989 | Brindopke | |
| 4,849,487 A | 7/1989 | Kaminsky et al. | |
| 4,866,023 A | 9/1989 | Ritter et al. | |
| 4,882,406 A | 11/1989 | Cozewith et al. | |
| 4,886,853 A | 12/1989 | Foster et al. | |
| 4,892,851 A | 1/1990 | Ewen et al. | |
| 4,929,509 A | 5/1990 | Godfrey | |
| 4,935,474 A | 6/1990 | Ewen et al. | |
| 4,937,299 A | 6/1990 | Ewen et al. | |
| 4,939,217 A | 7/1990 | Stricklen | |
| 4,950,720 A | 8/1990 | Randall, Jr. et al. | |
| 4,975,403 A | 12/1990 | Ewen | |
| 4,981,760 A | 1/1991 | Naito et al. | |

(Continued)

FOREIGN PATENT DOCUMENTS

CA    2157806    3/1997

(Continued)

OTHER PUBLICATIONS

U.S. Appl. No. 10/687,508, filed Oct. 15, 2003, entitled "Multiple Catalyst System for Olefin Polymerization and Polymers Produced Therefrom", Inventors: Jiang et al.

(Continued)

*Primary Examiner*—Katarzyna Wyrozebski

(57) ABSTRACT

Disclosed herein is an adhesive composition comprising a blend functionalized with a functional group, wherein the blend comprises a C3 to C40 olefin polymer and an additive, the C3 to C40 olefin polymer comprising at least 50 mol % of one or more C3 to C40 olefins, and where the C3 to C40 olefin polymer has: a Dot T-Peel of 1 Newton or more on Kraft paper; an Mw of 10,000 to 100,000; and a branching index (g') of 0.98 or less measured at the Mz of the polymer when the polymer has an Mw of 10,000 to 60,000, or a branching index (g') of 0.95 or less measured at the Mz of the polymer when the polymer has an Mw of 10,000 to 100,000. A process of producing the adhesive composition, as well as methods of utilizing the adhesive composition are also disclosed.

44 Claims, No Drawings

U.S. PATENT DOCUMENTS

| | | |
|---|---|---|
| 5,008,356 A | 4/1991 | Ishimaru et al. |
| 5,021,257 A | 6/1991 | Foster et al. |
| 5,035,283 A | 7/1991 | Brücher et al. |
| 5,036,034 A | 7/1991 | Ewen |
| 5,039,614 A | 8/1991 | Dekmezian et al. |
| 5,041,251 A | 8/1991 | McCoskey et al. |
| 5,091,352 A | 2/1992 | Kioka et al. |
| 5,096,743 A | 3/1992 | Schoenbeck |
| 5,114,897 A | 5/1992 | Schell, Jr. et al. |
| 5,115,030 A | 5/1992 | Tanuka et al. |
| 5,151,474 A | 9/1992 | Lange et al. |
| 5,155,080 A | 10/1992 | Elder et al. |
| 5,171,799 A | 12/1992 | Kioka et al. |
| 5,185,398 A | 2/1993 | Kehr et al. |
| 5,212,247 A | 5/1993 | Asanuma et al. |
| 5,216,095 A | 6/1993 | Dolle et al. |
| 5,218,071 A | 6/1993 | Tsutsui et al. |
| 5,219,913 A | 6/1993 | Tomomatsu et al. |
| 5,219,968 A | 6/1993 | Shiomura et al. |
| 5,225,500 A | 7/1993 | Elder et al. |
| 5,231,126 A | 7/1993 | Shi et al. .................... 524/296 |
| 5,232,992 A | 8/1993 | Asanuma et al. |
| 5,236,649 A | 8/1993 | Hall et al. |
| 5,236,962 A | 8/1993 | Govoni et al. |
| 5,244,996 A | 9/1993 | Kawasaki et al. |
| 5,246,779 A | 9/1993 | Heimberg et al. |
| 5,252,659 A | 10/1993 | Koizumi et al. |
| 5,271,976 A | 12/1993 | Kondo et al. |
| 5,272,236 A | 12/1993 | Lai et al. |
| 5,278,216 A | 1/1994 | Asanuma et al. |
| 5,278,220 A | 1/1994 | Vermeire et al. |
| 5,286,564 A | 2/1994 | Cecchin et al. |
| 5,292,561 A | 3/1994 | Peiffer et al. |
| 5,300,361 A | 4/1994 | Vowinkel et al. |
| 5,308,817 A | 5/1994 | Reddy et al. |
| 5,310,584 A | 5/1994 | Jacoby et al. |
| 5,314,956 A | 5/1994 | Asanuma et al. |
| 5,317,036 A | 5/1994 | Brady, III et al. |
| 5,317,070 A | 5/1994 | Brant et al. |
| 5,326,824 A | 7/1994 | Asanuma et al. |
| 5,332,707 A | 7/1994 | Karayannis et al. |
| 5,334,677 A | 8/1994 | Razavi et al. |
| 5,336,746 A | 8/1994 | Tsutsui et al. |
| 5,346,773 A | 9/1994 | Simoens |
| 5,350,817 A | 9/1994 | Winter et al. |
| 5,354,619 A | 10/1994 | Babu |
| 5,359,102 A | 10/1994 | Inoue et al. |
| 5,367,022 A | 11/1994 | Kiang et al. |
| 5,368,919 A | 11/1994 | Robeson |
| 5,369,196 A | 11/1994 | Matsumoto et al. |
| 5,373,059 A | 12/1994 | Asanuma et al. |
| 5,374,685 A | 12/1994 | Asanuma et al. |
| 5,374,700 A | 12/1994 | Tsutsui et al. |
| 5,397,843 A | 3/1995 | Lakshmanan et al. |
| 5,403,667 A | 4/1995 | Simoens |
| 5,410,003 A | 4/1995 | Bai |
| 5,416,228 A | 5/1995 | Ewen et al. |
| 5,430,070 A | 7/1995 | Kono |
| 5,434,115 A | 7/1995 | Yamada et al. |
| 5,439,994 A | 8/1995 | Inoue et al. |
| 5,459,217 A | 10/1995 | Todo et al. |
| 5,464,905 A | 11/1995 | Tsutsui et al. |
| 5,468,807 A | 11/1995 | Tsurutani et al. |
| 5,475,075 A | 12/1995 | Brant et al. |
| 5,480,848 A | 1/1996 | Geerts |
| 5,483,002 A | 1/1996 | Seelert et al. |
| 5,504,172 A | 4/1996 | Imuta et al. |
| 5,516,583 A | 5/1996 | Zhang et al. |
| 5,516,848 A | 5/1996 | Canich et al. |
| 5,519,091 A | 5/1996 | Tsutsui et al. |
| 5,525,689 A | 6/1996 | Tsutsui et al. |
| 5,527,846 A | 6/1996 | Christell et al. |
| 5,529,843 A | 6/1996 | Dries et al. |
| 5,529,943 A | 6/1996 | Hong et al. |
| 5,530,054 A | 6/1996 | Tse et al. |
| 5,532,396 A | 7/1996 | Winter et al. |
| 5,534,473 A | 7/1996 | Welch et al. |
| 5,539,056 A | 7/1996 | Yang et al. |
| 5,539,066 A | 7/1996 | Winter et al. |
| 5,543,373 A | 8/1996 | Winter et al. |
| 5,548,007 A | 8/1996 | Asanuma et al. |
| 5,548,008 A | 8/1996 | Asanuma et al. |
| 5,548,014 A | 8/1996 | Tse et al. |
| 5,552,489 A | 9/1996 | Merrill et al. |
| 5,554,668 A | 9/1996 | Scheve et al. |
| 5,556,920 A | 9/1996 | Tanaka et al. |
| 5,559,165 A | 9/1996 | Paul |
| 5,565,533 A | 10/1996 | Galimberti et al. |
| 5,565,534 A | 10/1996 | Aulbach et al. |
| 5,571,613 A | 11/1996 | Schuhmann et al. |
| 5,574,082 A | 11/1996 | Keller et al. |
| 5,576,259 A | 11/1996 | Hasegawa et al. |
| 5,576,260 A | 11/1996 | Winter et al. |
| 5,578,743 A | 11/1996 | Ho et al. |
| 5,579,913 A | 12/1996 | Yamada et al. |
| 5,585,448 A | 12/1996 | Resconi et al. |
| 5,585,508 A | 12/1996 | Küber et al. |
| 5,587,501 A | 12/1996 | Winter et al. |
| 5,591,785 A | 1/1997 | Scheve et al. |
| 5,591,817 A | 1/1997 | Asanuma et al. |
| 5,594,074 A | 1/1997 | Hwo et al. |
| 5,594,078 A | 1/1997 | Welch et al. |
| 5,594,080 A | 1/1997 | Waymouth et al. |
| 5,594,172 A | 1/1997 | Shirnohara |
| 5,595,827 A | 1/1997 | Yamada et al. |
| 5,596,052 A | 1/1997 | Resconi et al. |
| 5,599,881 A | 2/1997 | Xie |
| 5,599,885 A | 2/1997 | Kawasaki et al. |
| 5,602,223 A | 2/1997 | Sasaki et al. |
| 5,605,969 A | 2/1997 | Tsutsui et al. |
| 5,610,254 A | 3/1997 | Saguna et al. |
| 5,612,428 A | 3/1997 | Winter et al. |
| 5,618,369 A | 4/1997 | Peiffer et al. |
| 5,618,883 A | 4/1997 | Plamthottam et al. |
| 5,621,046 A | 4/1997 | Iwanami et al. |
| 5,622,760 A | 4/1997 | Leiss |
| 5,629,254 A | 5/1997 | Fukuoka et al. |
| 5,631,202 A | 5/1997 | Ewen |
| 5,633,010 A | 5/1997 | Chen |
| 5,633,018 A | 5/1997 | Stouffer et al. |
| 5,639,842 A | 6/1997 | Tsutsui et al. |
| 5,641,848 A | 6/1997 | Giacobbe et al. |
| 5,643,846 A | 7/1997 | Reddy et al. |
| 5,648,428 A | 7/1997 | Reddy et al. |
| 5,652,308 A | 7/1997 | Merrill et al. |
| 5,658,997 A | 8/1997 | Fukuoka et al. |
| 5,661,096 A | 8/1997 | Winter et al. |
| 5,663,232 A | 9/1997 | Seppanen et al. |
| 5,663,249 A | 9/1997 | Ewen |
| 5,665,469 A | 9/1997 | Brandt et al. |
| 5,667,902 A | 9/1997 | Brew et al. |
| 5,670,436 A | 9/1997 | Herrmann et al. |
| 5,672,668 A | 9/1997 | Winter et al. |
| 5,677,068 A | 10/1997 | Ghirardo et al. |
| 5,683,818 A | 11/1997 | Bolvari |
| 5,684,099 A | 11/1997 | Watanabe et al. |
| 5,686,533 A | 11/1997 | Gahleitner et al. |
| 5,693,730 A | 12/1997 | Küber et al. |
| 5,693,836 A | 12/1997 | Winter et al. |
| 5,696,045 A | 12/1997 | Winter et al. |
| 5,696,049 A | 12/1997 | Ikeyama et al. |
| 5,698,651 A | 12/1997 | Kawasaki et al. |
| 5,700,886 A | 12/1997 | Winter et al. |
| 5,700,895 A | 12/1997 | Kanda et al. |

| Patent No. | Date | Inventor |
|---|---|---|
| 5,703,180 A | 12/1997 | Tsutsui et al. |
| 5,705,565 A | 1/1998 | Hughes et al. |
| 5,705,584 A | 1/1998 | Fukuoka et al. |
| 5,710,223 A | 1/1998 | Fukuoka et al. |
| 5,714,426 A | 2/1998 | Tsutsui et al. |
| 5,714,427 A | 2/1998 | Winter et al. |
| 5,719,235 A | 2/1998 | Zandona |
| 5,719,241 A | 2/1998 | Razavi et al. |
| 5,723,546 A | 3/1998 | Sustic |
| 5,723,640 A | 3/1998 | Fukuoka et al. |
| 5,739,220 A | 4/1998 | Shamshoum et al. |
| 5,739,225 A | 4/1998 | Tazaki et al. |
| 5,739,366 A | 4/1998 | Imuta et al. |
| 5,741,868 A | 4/1998 | Winter et al. |
| 5,747,405 A | 5/1998 | Little et al. |
| 5,747,620 A | 5/1998 | Machida et al. |
| 5,747,621 A | 5/1998 | Resconi et al. |
| 5,753,769 A | 5/1998 | Ueda et al. |
| 5,753,771 A | 5/1998 | Xie |
| 5,756,141 A | 5/1998 | Chen et al. |
| 5,760,028 A | 6/1998 | Jadhav et al. |
| 5,763,349 A | 6/1998 | Zandona |
| 5,763,516 A | 6/1998 | Godfrey |
| 5,767,031 A | 6/1998 | Shamshoum et al. |
| 5,767,032 A | 6/1998 | Hokkanen et al. |
| 5,767,033 A | 6/1998 | Imuta et al. |
| 5,767,300 A | 6/1998 | Aulbach et al. |
| 5,773,129 A | 6/1998 | Wakamatsu et al. |
| 5,773,544 A | 6/1998 | Christell et al. |
| 5,776,851 A | 7/1998 | Küber et al. |
| 5,780,168 A | 7/1998 | Satoh et al. |
| 5,795,941 A | 8/1998 | Cree et al. |
| 5,798,175 A | 8/1998 | Tynan, Jr. et al. |
| 5,804,524 A | 9/1998 | Reddy et al. |
| 5,807,948 A | 9/1998 | Sugane et al. |
| 5,817,590 A | 10/1998 | Hasegawa et al. |
| 5,817,725 A | 10/1998 | Zandona |
| 5,827,252 A | 10/1998 | Werenicz et al. |
| 5,834,393 A | 11/1998 | Jacobsen et al. |
| 5,834,562 A | 11/1998 | Silvestri et al. |
| 5,840,783 A | 11/1998 | Momchilovich et al. |
| 5,840,815 A | 11/1998 | Tsutsui et al. |
| 5,843,577 A | 12/1998 | Ouhadi et al. |
| 5,844,037 A | 12/1998 | Lundgard et al. |
| 5,846,558 A | 12/1998 | Mielsen et al. |
| 5,846,654 A | 12/1998 | Modrak |
| 5,846,896 A | 12/1998 | Ewen |
| 5,846,918 A | 12/1998 | Meijer et al. |
| 5,847,059 A | 12/1998 | Shamshoum et al. |
| 5,849,409 A | 12/1998 | Pinoca et al. |
| 5,851,610 A | 12/1998 | Ristey et al. |
| 5,852,100 A | 12/1998 | Sadatoshi et al. |
| 5,852,116 A | 12/1998 | Cree et al. |
| 5,854,354 A | 12/1998 | Ueda et al. |
| 5,856,400 A | 1/1999 | Matsumura et al. |
| 5,856,406 A | 1/1999 | Silvis et al. |
| 5,858,293 A | 1/1999 | Yoo |
| 5,859,088 A | 1/1999 | Peterson et al. |
| 5,859,139 A | 1/1999 | Yoo |
| 5,861,211 A | 1/1999 | Thakkar et al. |
| 5,861,474 A | 1/1999 | Weller et al. |
| 5,863,665 A | 1/1999 | Kale et al. |
| 5,863,994 A | 1/1999 | DeNicola, Jr. et al. |
| 5,866,663 A | 2/1999 | Brookhart et al. |
| 5,867,316 A | 2/1999 | Carlson et al. |
| 5,869,555 A | 2/1999 | Simmons et al. |
| 5,874,505 A | 2/1999 | Saito et al. |
| 5,874,513 A | 2/1999 | Watanabe et al. |
| 5,876,855 A | 3/1999 | Wong et al. |
| 5,880,056 A | 3/1999 | Tsutsui et al. |
| 5,880,241 A | 3/1999 | Brookhart et al. |
| 5,880,323 A | 3/1999 | Brookhart, III et al. |
| 5,882,774 A | 3/1999 | Jonza et al. |
| 5,882,782 A | 3/1999 | Tsubone |
| 5,883,204 A | 3/1999 | Spencer et al. |
| 5,883,205 A | 3/1999 | Tsutsui et al. |
| 5,886,123 A | 3/1999 | Resconi et al. |
| 5,886,224 A | 3/1999 | Brookhart et al. |
| 5,888,607 A | 3/1999 | Seth et al. |
| 5,888,636 A | 3/1999 | Asanuma et al. |
| 5,891,946 A | 4/1999 | Nohara et al. |
| 5,891,963 A | 4/1999 | Brookhart et al. |
| 5,891,976 A | 4/1999 | Costa et al. |
| 5,900,294 A | 5/1999 | Murschall et al. |
| 5,902,848 A | 5/1999 | Burgin et al. |
| 5,914,376 A | 6/1999 | Herrmann et al. |
| 5,916,988 A | 6/1999 | Tsutsui et al. |
| 5,916,989 A | 6/1999 | Brookhart, III et al. |
| 5,922,823 A | 7/1999 | Sagane et al. |
| 5,936,051 A | 8/1999 | Santi et al. |
| 5,936,053 A | 8/1999 | Fukuoka et al. |
| 5,942,569 A | 8/1999 | Simmons et al. |
| 5,942,586 A | 8/1999 | Herrmann et al. |
| 5,959,046 A | 9/1999 | Imuta et al. |
| 5,969,217 A | 10/1999 | Rhodes |
| 5,977,251 A | 11/1999 | Kao et al. |
| 5,986,024 A | 11/1999 | Wilson, Jr. |
| 5,986,651 A | 11/1999 | Reber et al. |
| 5,990,331 A | 11/1999 | Winter et al. |
| 5,994,437 A | 11/1999 | Lebez et al. |
| 5,997,981 A | 12/1999 | McCormack et al. |
| 5,998,547 A | 12/1999 | Hohner |
| 6,002,033 A | 12/1999 | Razawi et al. |
| 6,004,897 A | 12/1999 | Imuta et al. |
| 6,008,262 A | 12/1999 | McKay et al. |
| 6,017,842 A | 1/2000 | Rosen et al. |
| 6,028,152 A | 2/2000 | Winter et al. |
| 6,034,164 A | 3/2000 | Elspass et al. |
| 6,034,259 A | 3/2000 | Brookhart et al. |
| 6,040,407 A | 3/2000 | Ishida et al. |
| 6,040,469 A | 3/2000 | Riedel et al. |
| 6,042,930 A | 3/2000 | Kelch et al. |
| 6,045,922 A | 4/2000 | Janssen et al. |
| 6,046,273 A | 4/2000 | Syed |
| 6,048,942 A | 4/2000 | Buehler et al. |
| 6,054,542 A | 4/2000 | Kojoh et al. |
| 6,054,544 A | 4/2000 | Finlayson et al. |
| 6,057,413 A | 5/2000 | Ima et al. |
| 6,060,139 A | 5/2000 | Peiffer et al. |
| 6,060,561 A | 5/2000 | Wolfschwenger et al. |
| 6,060,584 A | 5/2000 | Neely et al. |
| 6,063,482 A | 5/2000 | Peiffer et al. |
| 6,063,483 A | 5/2000 | Peiffer et al. |
| 6,063,838 A | 5/2000 | Patnode et al. |
| 6,069,213 A | 5/2000 | Nemzek et al. |
| 6,071,598 A | 6/2000 | Peiffer et al. |
| 6,077,907 A | 6/2000 | Raetzsch et al. |
| 6,080,818 A | 6/2000 | Thakker et al. |
| 6,084,010 A | 7/2000 | Baetzold et al. |
| 6,084,041 A | 7/2000 | Andtsjo et al. |
| 6,084,048 A | 7/2000 | Hozumi et al. |
| 6,086,982 A | 7/2000 | Peiffer et al. |
| 6,087,459 A | 7/2000 | Miro et al. |
| 6,090,325 A | 7/2000 | Wheat et al. |
| 6,090,903 A | 7/2000 | Kataoka et al. |
| 6,096,843 A | 8/2000 | Saito et al. |
| 6,100,351 A | 8/2000 | Sun et al. |
| 6,100,353 A | 8/2000 | Lynch et al. |
| 6,107,422 A | 8/2000 | Wang et al. |
| 6,107,430 A | 8/2000 | Dubois et al. |
| 6,107,431 A | 8/2000 | Resconi et al. |
| 6,110,986 A | 8/2000 | Nozawa et al. |
| 6,113,996 A | 9/2000 | Amon et al. |
| 6,114,261 A | 9/2000 | Strelow et al. |
| 6,114,457 A | 9/2000 | Markel et al. |
| 6,114,477 A | 9/2000 | Merrill et al. |

| | | | | | | |
|---|---|---|---|---|---|---|
| 6,117,962 | A | 9/2000 | Weng et al. | 6,310,140 B1 | 10/2001 | Raetzsch et al. |
| 6,121,185 | A | 9/2000 | Rosen et al. | 6,310,163 B1 | 10/2001 | Brookhart et al. |
| 6,121,377 | A | 9/2000 | Chien | 6,313,184 B1 | 11/2001 | Sasaki et al. |
| 6,121,393 | A | 9/2000 | Kioka et al. | 6,319,979 B1 | 11/2001 | Dubois et al. |
| 6,121,401 | A | 9/2000 | Yamamoto et al. | 6,319,991 B1 | 11/2001 | Okayama et al. |
| 6,121,402 | A | 9/2000 | Machida et al. | 6,319,998 B1 | 11/2001 | Cozewith et al. |
| 6,124,231 | A | 9/2000 | Fritze et al. | 6,323,151 B1 | 11/2001 | Siedle et al. |
| 6,124,400 | A | 9/2000 | Chien | 6,323,284 B1 | 11/2001 | Peacock |
| 6,127,484 | A | 10/2000 | Cribbs et al. | 6,323,286 B1 | 11/2001 | Kuramochi et al. |
| 6,140,439 | A | 10/2000 | Brookhart et al. | 6,325,956 B2 | 12/2001 | Chaudhary et al. |
| 6,143,683 | A | 11/2000 | Shamshoum et al. | 6,326,426 B1 | 12/2001 | Ellul |
| 6,143,825 | A | 11/2000 | Beren et al. | 6,326,427 B1 | 12/2001 | Birnbrich et al. |
| 6,143,844 | A | 11/2000 | Hokkanen et al. | 6,326,432 B1 | 12/2001 | Fujita et al. |
| 6,143,846 | A | 11/2000 | Herrmann et al. | 6,326,444 B2 | 12/2001 | Lynch et al. |
| 6,147,174 | A | 11/2000 | Holtcamp et al. | 6,329,313 B1 | 12/2001 | Fritze et al. |
| 6,147,180 | A | 11/2000 | Markel et al. | 6,329,454 B1 | 12/2001 | Krabbenborg |
| 6,150,481 | A | 11/2000 | Winter et al. | 6,329,468 B1 | 12/2001 | Wang |
| 6,153,549 | A | 11/2000 | Hubscher et al. | 6,331,590 B1 | 12/2001 | Herrmann et al. |
| 6,156,844 | A | 12/2000 | Hashimoto et al. | 6,331,595 B1 | 12/2001 | Mitchell et al. |
| 6,156,846 | A | 12/2000 | Tsuruoka et al. | 6,339,109 B1 | 1/2002 | Day et al. |
| 6,159,888 | A | 12/2000 | Welch et al. | 6,339,136 B1 | 1/2002 | Huikku et al. |
| 6,162,871 | A | 12/2000 | Watanabe et al. | 6,340,703 B1 | 1/2002 | Kelly |
| 6,166,161 | A | 12/2000 | Mullins et al. | 6,340,730 B1 | 1/2002 | Murray et al. |
| 6,174,930 | B1 | 1/2001 | Agarwal et al. | 6,342,574 B1 | 1/2002 | Weng et al. |
| 6,174,946 | B1 | 1/2001 | Rubenacker et al. | 6,346,580 B1 | 2/2002 | Fujita et al. |
| 6,174,974 | B1 | 1/2001 | Starzewski et al. | 6,348,272 B1 | 2/2002 | Haveaux et al. |
| 6,177,190 | B1 | 1/2001 | Gehlsen et al. | 6,350,791 B1 | 2/2002 | Feichtmeier et al. |
| 6,177,377 | B1 | 1/2001 | Chien | 6,350,828 B1 | 2/2002 | Takaoka et al. |
| 6,177,526 | B1 | 1/2001 | Fritze | 6,350,829 B1 | 2/2002 | Lynch et al. |
| 6,177,527 | B1 | 1/2001 | Sishta et al. | 6,350,830 B1 | 2/2002 | Göres et al. |
| 6,180,229 | B1 | 1/2001 | Becker et al. | 6,352,948 B1 | 3/2002 | Pike et al. |
| 6,180,732 | B1 | 1/2001 | Ewen | 6,355,747 B1 | 3/2002 | Rausch et al. |
| 6,184,327 | B1 | 2/2001 | Weng et al. | 6,359,077 B1 | 3/2002 | Avgousti et al. |
| 6,191,241 | B1 | 2/2001 | Starzewski et al. | 6,359,095 B1 | 3/2002 | Winter et al. |
| 6,197,910 | B1 | 3/2001 | Weng et al. | 6,362,125 B1 | 3/2002 | Shamshoum et al. |
| 6,207,606 | B1 | 3/2001 | Lue et al. | 6,365,763 B1 | 4/2002 | Winter et al. |
| 6,207,748 | B1 | 3/2001 | Tse et al. | 6,365,779 B2 | 4/2002 | Devore et al. |
| 6,207,773 | B1 | 3/2001 | Ting et al. | 6,368,708 B1 | 4/2002 | Brown et al. |
| 6,211,110 | B1 | 4/2001 | Santi et al. | 6,369,175 B1 | 4/2002 | Ewen |
| 6,214,447 | B1 | 4/2001 | Nakagawa et al. | 6,369,176 B1 | 4/2002 | Laughner et al. |
| 6,214,948 | B1 | 4/2001 | Zandona | 6,376,410 B1 | 4/2002 | Burkhardt et al. |
| 6,214,949 | B1 | 4/2001 | Reddy et al. | 6,376,416 B1 | 4/2002 | Hirakawa et al. |
| 6,214,952 | B1 | 4/2001 | Sadatoshi et al. | 6,380,327 B1 | 4/2002 | Teasley |
| 6,218,457 | B1 | 4/2001 | Fralich et al. | 6,391,974 B1 | 5/2002 | Ogawa et al. |
| 6,218,488 | B1 | 4/2001 | Schiggino et al. | 6,395,831 B1 | 5/2002 | Pelliconi et al. |
| 6,218,493 | B1 | 4/2001 | Johnson et al. | 6,399,531 B1 | 6/2002 | Job et al. |
| 6,221,802 | B1 | 4/2001 | Costa et al. | 6,403,677 B1 | 6/2002 | Walker |
| 6,221,981 | B1 | 4/2001 | Jung et al. | 6,403,708 B2 | 6/2002 | Moriya et al. |
| 6,225,432 | B1 | 5/2001 | Weng et al. | 6,403,855 B1 | 6/2002 | Mertens |
| 6,228,948 | B1 | 5/2001 | Flaris et al. | 6,407,189 B1 | 6/2002 | Herrmann |
| 6,245,856 | B1 | 6/2001 | Kaufman et al. | 6,413,899 B1 | 7/2002 | Dolle et al. |
| 6,248,829 | B1 | 6/2001 | Fischer et al. | 6,420,516 B1 | 7/2002 | Tau et al. |
| 6,248,832 | B1 | 6/2001 | Peacock | 6,423,793 B1 | 7/2002 | Weng et al. |
| 6,248,845 | B1 | 6/2001 | Loveday et al. | 6,429,274 B1 | 8/2002 | Siedle et al. |
| 6,255,246 | B1 | 7/2001 | Devore et al. | 6,448,358 B2 | 9/2002 | Siedle et al. |
| 6,255,414 | B1 | 7/2001 | Ittel et al. | 6,472,477 B2 | 10/2002 | Kanzaki et al. |
| 6,255,426 | B1 | 7/2001 | Lue et al. | 6,476,135 B1 | 11/2002 | Bugada et al. |
| 6,258,903 | B1 | 7/2001 | Mawson et al. | 6,482,907 B1 | 11/2002 | Wang et al. |
| 6,265,512 | B1 | 7/2001 | Siedle et al. | 6,486,246 B1 | 11/2002 | Vion |
| 6,268,445 | B1 | 7/2001 | McAdon et al. | 6,489,426 B1 | 12/2002 | Kawamoto et al. |
| 6,268,453 | B1 | 7/2001 | Köppl et al. | 6,492,465 B1 | 12/2002 | Burkhardt et al. |
| 6,271,164 | B1 | 8/2001 | Fritze et al. | 6,495,646 B1 | 12/2002 | Arthur et al. |
| 6,271,323 | B1 | 8/2001 | Loveday et al. | 6,500,540 B1 | 12/2002 | Langohr et al. |
| 6,277,479 | B1 | 8/2001 | Campbell et al. | 6,503,993 B1 | 1/2003 | Huovinen et al. |
| 6,281,289 | B1 | 8/2001 | Maugans et al. | 6,506,839 B1 | 1/2003 | Nishihara et al. |
| 6,287,658 | B1 | 9/2001 | Cosentino et al. | 6,506,847 B1 | 1/2003 | Song |
| 6,294,632 | B1 | 9/2001 | Shiraishi et al. | 6,509,107 B2 | 1/2003 | Ding et al. |
| 6,297,301 | B1 | 10/2001 | Erderly et al. | 6,509,288 B1 | 1/2003 | Dorer et al. |
| 6,300,398 | B1 | 10/2001 | Jialanella et al. | 6,511,755 B1 | 1/2003 | Mochizuki et al. |
| 6,300,419 | B1 | 10/2001 | Sehanobish et al. | 6,512,019 B1 | 1/2003 | Agarwal et al. |
| 6,300,451 | B1 | 10/2001 | Mehta et al. | 6,512,050 B2 | 1/2003 | Kanamori et al. |
| 6,303,696 | B1 | 10/2001 | Ushioda et al. | 6,515,086 B1 | 2/2003 | Razavi |
| 6,306,970 | B1 | 10/2001 | Dang et al. | 6,518,327 B1 | 2/2003 | Dang et al. |

| | | |
|---|---|---|
| 6,518,386 B1 | 2/2003 | Resconi et al. |
| 6,521,675 B1 | 2/2003 | Wu et al. |
| 6,521,693 B2 | 2/2003 | Saito et al. |
| 6,525,157 B2 | 2/2003 | Cozewith et al. ............ 526/348 |
| 6,528,448 B1 | 3/2003 | Jensen et al. |
| 6,534,608 B2 | 3/2003 | Peterson et al. |
| 6,537,478 B1 | 3/2003 | Grasmeder et al. |
| 6,537,652 B1 | 3/2003 | Kochem et al. |
| 6,545,072 B2 | 4/2003 | Tamura et al. |
| 6,545,099 B2 | 4/2003 | Shinozaki et al. |
| 6,545,108 B1 | 4/2003 | Moody et al. |
| 6,548,579 B2 | 4/2003 | Reski et al. |
| 6,551,955 B1 | 4/2003 | Diefenbach |
| 6,555,643 B1 | 4/2003 | Rieger |
| 6,559,211 B2 | 5/2003 | Zhao et al. |
| 6,562,886 B1 | 5/2003 | Minami et al. |
| 6,562,914 B1 | 5/2003 | Andtsjo et al. |
| 6,569,915 B1 | 5/2003 | Jackson et al. |
| 6,569,965 B2 | 5/2003 | Markel et al. |
| 6,573,350 B1 | 6/2003 | Markel et al. |
| 6,573,352 B1 | 6/2003 | Tatsumi et al. |
| 6,613,816 B2 | 9/2003 | Mahdi et al. |
| 6,635,733 B2 | 10/2003 | Yahata et al. |
| 6,639,018 B2 | 10/2003 | Yunoki et al. |
| 6,646,019 B2 | 11/2003 | Perez et al. |
| 6,646,051 B1 | 11/2003 | Demain |
| 6,649,685 B2 | 11/2003 | Saito et al. |
| 6,653,385 B2 | 11/2003 | Wang et al. |
| 6,657,009 B2 | 12/2003 | Zhou |
| 6,657,025 B2 | 12/2003 | Blackmon et al. |
| 6,660,805 B1 | 12/2003 | Righettini et al. |
| 6,664,306 B2 | 12/2003 | Gaddam et al. |
| 6,664,309 B2 | 12/2003 | Svenningsen et al. |
| 6,673,870 B2 | 1/2004 | Owens et al. |
| 6,677,403 B1 | 1/2004 | Abe |
| 6,686,433 B1 | 2/2004 | Miro et al. |
| 6,703,457 B2 | 3/2004 | van Baar et al. |
| 6,709,734 B2 | 3/2004 | Higashi et al. |
| 6,710,134 B2 | 3/2004 | Demain |
| 6,713,573 B2 | 3/2004 | Wenzel et al. |
| 6,723,769 B2 | 4/2004 | Miller et al. |
| 6,727,332 B2 | 4/2004 | Demain |
| 6,730,742 B1 | 5/2004 | Demain |
| 6,734,253 B2 | 5/2004 | Krabbenborg et al. |
| 6,734,270 B1 | 5/2004 | Minami et al. |
| 6,747,103 B1 | 6/2004 | Vestberg et al. |
| 6,747,114 B2 | 6/2004 | Karandinos et al. ...... 526/348.2 |
| 6,750,288 B2 | 6/2004 | Pradel |
| 6,756,098 B2 | 6/2004 | Zhou et al. |
| 6,756,463 B2 | 6/2004 | Sugano et al. |
| 6,774,069 B2 | 8/2004 | Zhou et al. .................. 442/328 |
| 6,784,250 B2 | 8/2004 | Kijima |
| 6,797,774 B2 | 9/2004 | Kijima |
| 6,800,700 B2 | 10/2004 | Sun |
| 6,825,292 B2 | 11/2004 | Reid |
| 6,828,022 B2 | 12/2004 | Bisleri et al. |
| 6,833,180 B1 | 12/2004 | Kodemura |
| 6,833,404 B2 | 12/2004 | Quinn et al. |
| 6,841,620 B2 | 1/2005 | Ansems et al. |
| 6,844,078 B2 | 1/2005 | Su et al. |
| 6,855,406 B2 | 2/2005 | Takayasu et al. |
| 6,855,411 B2 | 2/2005 | Su et al. |
| 6,855,424 B1 | 2/2005 | Thomas et al. |
| 6,855,656 B2 | 2/2005 | Hosaka et al. |
| 6,855,777 B2 | 2/2005 | McLoughlin et al. |
| 6,858,667 B1 | 2/2005 | Flerlage et al. |
| 6,858,676 B1 | 2/2005 | Johoji et al. |
| 6,858,695 B2 | 2/2005 | Schmidt, Jr. et al. |
| 6,858,700 B2 | 2/2005 | Dahl et al. |
| 6,861,472 B2 | 3/2005 | Adedeji et al. |
| 6,863,989 B1 | 3/2005 | Dyatlov et al. |
| 6,867,252 B1 | 3/2005 | Tomomatsu et al. |
| 6,867,253 B1 | 3/2005 | Chen |
| 6,872,790 B2 | 3/2005 | Ewen |
| 6,878,327 B2 | 4/2005 | Cooper et al. |
| 6,878,756 B2 | 4/2005 | Cinelli et al. |
| 6,881,793 B2 | 4/2005 | Sheldon et al. |
| 6,884,846 B2 | 4/2005 | Pradel |
| 6,884,851 B2 | 4/2005 | Gauthy |
| 6,887,941 B2 | 5/2005 | Zhou |
| 6,887,943 B2 | 5/2005 | Onoe et al. |
| 6,890,661 B2 | 5/2005 | Pradel |
| 6,897,261 B1 | 5/2005 | Machida et al. |
| 6,924,342 B2 | 8/2005 | Stevens et al. |
| 6,984,680 B2 | 1/2006 | Quinn |
| 7,064,163 B2 | 6/2006 | Shida |
| 7,067,196 B2 | 6/2006 | Pradel et al. |
| 7,067,585 B2 | 6/2006 | Wang et al. |
| 7,078,468 B2 | 7/2006 | Thorman |
| 7,081,299 B2 | 7/2006 | Richeson |
| 7,081,493 B2 | 7/2006 | Kawai et al. |
| 7,087,314 B2 | 8/2006 | Forte et al. |
| 7,091,277 B2 | 8/2006 | Rydin et al. |
| 7,094,463 B2 | 8/2006 | Haas et al. |
| 7,094,820 B2 | 8/2006 | Zhao et al. |
| 7,101,622 B2 | 9/2006 | Chang et al. |
| 7,101,926 B2 | 9/2006 | McMichael et al. |
| 7,101,929 B2 | 9/2006 | Zah et al. |
| 7,105,604 B2 | 9/2006 | Shimizu et al. |
| 7,105,609 B2 | 9/2006 | Datta et al. |
| 7,109,265 B2 | 9/2006 | Kucera et al. |
| 7,109,269 B2 | 9/2006 | Stevens et al. |
| 7,112,642 B2 | 9/2006 | Meesters et al. |
| 7,115,694 B2 | 10/2006 | Shimizu et al. |
| 7,119,154 B2 | 10/2006 | Coates et al. |
| 7,122,584 B2 | 10/2006 | Moriya et al. |
| 7,122,604 B2 | 10/2006 | Onoe et al. |
| 7,125,924 B2 | 10/2006 | Credali et al. |
| 7,129,292 B1 | 10/2006 | Kristen et al. |
| 7,138,173 B2 | 11/2006 | Wheatley et al. |
| 7,141,182 B2 | 11/2006 | Walters et al. |
| 7,141,300 B2 | 11/2006 | Yamamoto et al. |
| 7,144,542 B2 | 12/2006 | Holzer et al. |
| 7,148,305 B2 | 12/2006 | Stevens et al. |
| 7,169,871 B2 | 1/2007 | Morini et al. |
| 7,208,552 B2 | 4/2007 | Komoto et al. |
| 7,211,537 B2 | 5/2007 | Fujita et al. |
| 7,214,745 B2 | 5/2007 | Arai et al. |
| 7,217,455 B2 | 5/2007 | Valdez |
| 7,217,766 B2 | 5/2007 | Datta et al. |
| 7,226,880 B2 | 6/2007 | Potnis |
| 7,226,974 B2 | 6/2007 | Nishihara |
| 7,229,687 B2 | 6/2007 | Kinning et al. |
| 7,232,872 B2 | 6/2007 | Shaffer et al. |
| 7,235,191 B2 | 6/2007 | Schmidt et al. |
| 7,235,610 B2 | 6/2007 | Fujino et al. |
| 7,235,618 B2 | 6/2007 | Lin et al. |
| 7,238,759 B2 | 7/2007 | Stevens et al. |
| 7,238,846 B2 | 7/2007 | Janssen et al. |
| 7,241,844 B2 | 7/2007 | Bouhelal |
| 7,247,675 B2 | 7/2007 | Thomas et al. |
| 7,250,211 B1 | 7/2007 | Minami et al. |
| 7,250,470 B2 | 7/2007 | Stevens et al. |
| 7,250,471 B2 | 7/2007 | Stevens et al. |
| 7,253,234 B2 | 8/2007 | Mori et al. |
| 7,262,251 B2 | 8/2007 | Kanderski et al. |
| 7,268,185 B2 | 9/2007 | Shimojo et al. |
| 2001/0004662 A1 | 6/2001 | Bidell et al. |
| 2001/0007896 A1 | 7/2001 | Agarwal et al. |
| 2001/0016639 A1 | 8/2001 | Agarwal et al. |
| 2001/0031843 A1 | 10/2001 | Whiteker et al. |
| 2001/0034299 A1 | 10/2001 | Terry et al. |
| 2001/0044505 A1 | 11/2001 | Ford et al. |
| 2001/0044515 A1 | 11/2001 | Siedel et al. |
| 2001/0047064 A1 | 11/2001 | Sun |
| 2001/0053837 A1 | 12/2001 | Agarwal et al. |

| | | | |
|---|---|---|---|
| 2002/0007033 A1* | 1/2002 | Karandinos et al. ...... 526/348.3 | |
| 2002/0010077 A1 | 1/2002 | Lue et al. | |
| 2002/0013440 A1 | 1/2002 | Agarwal et al. | |
| 2002/0016254 A1 | 2/2002 | Whiteker et al. | |
| 2002/0040114 A1 | 4/2002 | Loveday et al. | |
| 2002/0045054 A1 | 4/2002 | Uhara et al. | |
| 2002/0049135 A1 | 4/2002 | Moody et al. | |
| 2002/0061945 A1 | 5/2002 | Oates et al. | |
| 2002/0064653 A1 | 5/2002 | Ladika et al. | |
| 2002/0065192 A1 | 5/2002 | Mackenzie et al. | |
| 2002/0086955 A1 | 7/2002 | Kendrick | |
| 2002/0123538 A1 | 9/2002 | Zhou et al. ................. 523/176 | |
| 2002/0124956 A1 | 9/2002 | Zhou .......................... 156/334 | |
| 2002/0132923 A1 | 9/2002 | Langohr et al. | |
| 2003/0078350 A1 | 4/2003 | Weng et al. ................. 526/160 | |
| 2003/0096896 A1 | 5/2003 | Wang et al. | |
| 2004/0023037 A1 | 2/2004 | Baumert et al. ............. 428/421 | |
| 2004/0034170 A1 | 2/2004 | Brant | |
| 2004/0039117 A1 | 2/2004 | Kijima ........................ 525/55 | |
| 2004/0048984 A1 | 3/2004 | Weng et al. ................. 525/245 | |
| 2004/0127614 A1 | 7/2004 | Jiang et al. ................. 524/270 | |
| 2004/0138392 A1 | 7/2004 | Jiang et al. ................. 526/114 | |
| 2004/0220320 A1 | 11/2004 | Abhari et al. ............... 524/487 | |
| 2004/0220336 A1 | 11/2004 | Abhari et al. | |
| 2004/0220359 A1 | 11/2004 | Abhari et al. ................ 526/65 | |
| 2004/0249046 A1 | 12/2004 | Abhari et al. ............... 524/474 | |

FOREIGN PATENT DOCUMENTS

| | | |
|---|---|---|
| CA | 2407183 | 4/2003 |
| DE | 2316614 | 10/1973 |
| DE | 19960411 | 7/2001 |
| DE | 19963585 | 7/2001 |
| EP | 0 033 220 | 8/1981 |
| EP | 0 930 320 | 10/1983 |
| EP | 0 115 434 | 8/1984 |
| EP | 0 263 718 | 4/1988 |
| EP | 0 248 708 | 10/1988 |
| EP | 0 284 707 | 10/1988 |
| EP | 0 319 043 | 6/1989 |
| EP | 0 366 411 | 5/1990 |
| EP | 0 387 691 | 9/1990 |
| EP | 0 486 293 | 9/1991 |
| EP | 0 459 264 | 12/1991 |
| EP | 0 513 808 | 11/1992 |
| EP | 0 515 132 | 11/1992 |
| EP | 0 524 624 | 1/1993 |
| EP | 0375730 | 1/1993 |
| EP | 0 530 908 | 3/1993 |
| EP | 0 536 104 | 4/1993 |
| EP | 0 417 428 | 9/1993 |
| EP | 0 577 581 | 1/1994 |
| EP | 0 363 029 | 8/1994 |
| EP | 0 612 768 | 8/1994 |
| EP | 0 310 734 | 11/1994 |
| EP | 0 647 246 | 11/1994 |
| EP | 0 653 433 | 5/1995 |
| EP | 0 666 267 | 8/1995 |
| EP | 0 557 718 | 10/1995 |
| EP | 0 516 019 | 12/1995 |
| EP | 0 564 596 | 2/1996 |
| EP | 0 695 765 | 2/1996 |
| EP | 0 516 018 | 3/1996 |
| EP | 0 700 937 | 3/1996 |
| EP | 0 648 801 | 4/1996 |
| EP | 0 593 083 | 5/1996 |
| EP | 0 718 359 | 6/1996 |
| EP | 0 719 829 | 7/1996 |
| EP | 0 553 757 | 9/1996 |
| EP | 0 733 652 | 9/1996 |
| EP | 0 652 905 | 10/1996 |
| EP | 0 747 430 | 12/1996 |
| EP | 0 749 989 | 12/1996 |
| EP | 0 773 238 | 5/1997 |
| EP | 0 773 239 | 5/1997 |
| EP | 0 791 607 | 5/1997 |
| EP | 0 643 100 | 7/1997 |
| EP | 0 527 221 | 9/1997 |
| EP | 0 598 628 | 9/1997 |
| EP | 0 620 257 | 9/1997 |
| EP | 0 803 559 | 10/1997 |
| EP | 0 812 854 | 12/1997 |
| EP | 0 700 934 | 1/1998 |
| EP | 0 661 300 | 3/1998 |
| EP | 0 832 924 | 4/1998 |
| EP | 0 646 604 | 5/1998 |
| EP | 0 841 349 | 5/1998 |
| EP | 0 842 955 | 5/1998 |
| EP | 0 527 589 | 6/1998 |
| EP | 0 563 917 | 6/1998 |
| EP | 0 613 908 | 7/1998 |
| EP | 0 948 432 | 7/1998 |
| EP | 0 958 318 | 7/1998 |
| EP | 0 857 735 | 8/1998 |
| EP | 0 958 313 | 8/1998 |
| EP | 0 958 314 | 8/1998 |
| EP | 0 958 324 | 8/1998 |
| EP | 0 864 593 | 9/1998 |
| EP | 0 500 944 | 10/1998 |
| EP | 0 573 120 | 11/1998 |
| EP | 0 879 849 | 11/1998 |
| EP | 0 977 666 | 11/1998 |
| EP | 0 977 808 | 11/1998 |
| EP | 0 788 521 | 12/1998 |
| EP | 0 882 731 | 12/1998 |
| EP | 0 889 089 | 1/1999 |
| EP | 0 584 609 | 3/1999 |
| EP | 0 627 447 | 4/1999 |
| EP | 0 685 498 | 5/1999 |
| EP | 0 696 303 | 6/1999 |
| EP | 0 922 653 | 6/1999 |
| EP | 1 040 140 | 6/1999 |
| EP | 1 040 146 | 6/1999 |
| EP | 1 044 225 | 6/1999 |
| EP | 0 608 054 | 7/1999 |
| EP | 1 049 730 | 7/1999 |
| EP | 0 827 526 | 8/1999 |
| EP | 0 747 403 | 9/1999 |
| EP | 0 950 667 | 10/1999 |
| EP | 0 953 581 | 11/1999 |
| EP | 0 602 716 | 12/1999 |
| EP | 0 423 101 | 1/2000 |
| EP | 0 974 601 | 1/2000 |
| EP | 0 909 284 | 2/2000 |
| EP | 0 731 729 | 3/2000 |
| EP | 0 909 283 | 3/2000 |
| EP | 0 985 677 | 3/2000 |
| EP | 0 719 797 | 4/2000 |
| EP | 0 719 802 | 5/2000 |
| EP | 0 769 505 | 5/2000 |
| EP | 1 141 051 | 6/2000 |
| EP | 0 586 168 | 7/2000 |
| EP | 0889912 | 7/2000 |
| EP | 1 031 580 | 8/2000 |
| EP | 0 889 911 | 11/2000 |
| EP | 1 050 558 | 11/2000 |
| EP | 0 654 476 | 1/2001 |
| EP | 1 077 244 | 2/2001 |
| EP | 0 702 030 | 3/2001 |
| EP | 1 081 203 | 3/2001 |
| EP | 1 081 204 | 3/2001 |
| EP | 0 882 069 | 4/2001 |
| EP | 0 882 076 | 4/2001 |
| EP | 1 238 035 | 4/2001 |
| EP | 0 351 392 | 5/2001 |
| EP | 0 882 077 | 5/2001 |

| | | | | | |
|---|---|---|---|---|---|
| EP | 1 095 944 | 5/2001 | WO | 98/02471 | 1/1998 |
| EP | 1 095 951 | 5/2001 | WO | 98/03603 | 1/1998 |
| EP | 1 100 854 | 5/2001 | WO | 98/09996 | 3/1998 |
| EP | 0 824 113 | 6/2001 | WO | 96/13531 | 5/1998 |
| EP | 1 237 963 | 6/2001 | WO | 98/23690 | 6/1998 |
| EP | 1 252 231 | 7/2001 | WO | 98/23699 | 6/1998 |
| EP | 0 619 325 | 8/2001 | WO | 98/29249 | 7/1998 |
| EP | 1 023 379 | 8/2001 | WO | 98/32784 | 7/1998 |
| EP | 0 886 656 | 9/2001 | WO | 98/33860 | 8/1998 |
| EP | 1 144 533 | 10/2001 | WO | 98/34965 | 8/1998 |
| EP | 0 963 382 | 11/2001 | WO | 98/34970 | 8/1998 |
| EP | 1 153 944 | 11/2001 | WO | 98/34971 | 8/1998 |
| EP | 0 645 401 | 12/2001 | WO | 98/34985 | 8/1998 |
| EP | 0 707 010 | 12/2001 | WO | 98/38374 | 9/1998 |
| EP | 0 747 402 | 12/2001 | WO | 98/41574 | 9/1998 |
| EP | 0 821 748 | 12/2001 | WO | 98/42780 | 10/1998 |
| EP | 0 891 381 | 12/2001 | WO | 98/46694 | 10/1998 |
| EP | 1 118 637 | 12/2001 | WO | 98/49229 | 11/1998 |
| EP | 1 066 330 | 2/2002 | WO | 98/52686 | 11/1998 |
| EP | 1 181 979 | 2/2002 | WO | 98/57998 | 12/1998 |
| EP | 0 659 757 | 3/2002 | WO | WO 99/01481 | 1/1999 |
| EP | 1 197 500 | 4/2002 | WO | 99/05152 | 2/1999 |
| EP | 1 089 878 | 5/2002 | WO | 99/10425 | 3/1999 |
| EP | 1 231 236 | 8/2002 | WO | 99/14046 | 3/1999 |
| EP | 0 868 498 | 1/2003 | WO | 99/14047 | 3/1999 |
| EP | 1 295 925 | 3/2003 | WO | 99/14262 | 3/1999 |
| EP | 1 295 926 A | 3/2003 | WO | 99/19394 | 4/1999 |
| EP | 1 165 622 | 4/2003 | WO | 99/20664 | 4/1999 |
| FR | 1396054 | 4/1965 | WO | 99/20694 | 4/1999 |
| FR | 1582841 | 10/1969 | WO | 99/20701 | 4/1999 |
| GB | 2323846 | 3/1997 | WO | 1023339 | 4/1999 |
| JP | 51114438 | 10/1976 | WO | 99/24516 | 5/1999 |
| JP | 56072033 | 6/1981 | WO | 99/29742 | 6/1999 |
| JP | 56109213 | 8/1981 | WO | 99/29743 | 6/1999 |
| JP | 57030774 | 2/1982 | WO | 99/29749 | 6/1999 |
| JP | 57076041 | 5/1982 | WO | 99/32272 | 7/1999 |
| JP | 58049736 | 3/1983 | WO | 99/32288 | 7/1999 |
| JP | 59159843 | 9/1984 | WO | 99/32525 | 7/1999 |
| JP | 59217709 | 12/1984 | WO | 99/37711 | 7/1999 |
| JP | 60011538 | 1/1985 | WO | 99/46348 | 9/1999 |
| JP | 01054010 | 3/1989 | WO | 99/54421 | 10/1999 |
| JP | 0 208 6676 | 3/1990 | WO | 99/60060 | 11/1999 |
| JP | 08336937 | 12/1996 | WO | 99/61487 | 12/1999 |
| JP | 11115127 | 4/1999 | WO | 99/65949 | 12/1999 |
| JP | 99349634 A | 12/1999 | WO | 99/67094 | 12/1999 |
| WO | 1990/12839 | 4/1989 | WO | 00/00565 | 1/2000 |
| WO | 89/12828 | 12/1989 | WO | 00/01745 | 1/2000 |
| WO | WO 91/07472 | 5/1991 | WO | 00/23483 | 4/2000 |
| WO | WO 92/20644 | 11/1992 | WO | 00/29655 | 5/2000 |
| WO | WO 94/04625 | 3/1994 | WO | 00/37514 | 6/2000 |
| WO | 94/07930 | 4/1994 | WO | 00/44799 | 8/2000 |
| WO | 94/12193 | 6/1994 | WO | 00/47592 | 8/2000 |
| WO | 94/13715 | 6/1994 | WO | 00/50466 | 8/2000 |
| WO | 94/25498 | 11/1994 | WO | 00/50475 | 8/2000 |
| WO | 94/25526 | 11/1994 | WO | 00/58320 | 10/2000 |
| WO | WO 95/10575 | 4/1995 | WO | 00/59721 | 10/2000 |
| WO | 95/24449 | 9/1995 | WO | 00/69869 | 11/2000 |
| WO | 96/12744 | 5/1996 | WO | 00/69963 | 11/2000 |
| WO | 96/23010 | 8/1996 | WO | 00/75198 | 12/2000 |
| WO | 96/23751 | 8/1996 | WO | 01/00257 | 1/2001 |
| WO | 96/26967 | 9/1996 | WO | 01/00691 | 1/2001 |
| WO | 96/27622 | 9/1996 | WO | 01/02444 | 1/2001 |
| WO | 96/29460 | 9/1996 | WO | WO 01/00693 | 1/2001 |
| WO | 96/37568 | 11/1996 | WO | 01/09200 | 2/2001 |
| WO | 97/04271 | 2/1997 | WO | 01/14429 | 3/2001 |
| WO | 97/49738 | 2/1997 | WO | 01/16189 | 3/2001 |
| WO | 97/12919 | 4/1997 | WO | 01/18109 | 3/2001 |
| WO | WO 97/20872 | 6/1997 | WO | 01/19609 | 3/2001 |
| WO | 97/23577 | 7/1997 | WO | 01/23396 | 4/2001 |
| WO | 97/26287 | 7/1997 | WO | 01/25296 | 4/2001 |
| WO | 97/29138 | 8/1997 | WO | 01/27213 | 4/2001 |
| WO | 97/33921 | 9/1997 | WO | 01/29096 | 4/2001 |
| WO | 98/02467 | 1/1998 | WO | 01/32721 | 5/2001 |

| | | |
|---|---|---|
| WO | 01/34665 | 5/2001 |
| WO | 01/40325 | 6/2001 |
| WO | 01/42322 | 6/2001 |
| WO | 01/42323 | 6/2001 |
| WO | 01/42350 | 6/2001 |
| WO | 01/44309 | 6/2001 |
| WO | 01/46274 | 6/2001 |
| WO | 01/46277 | 6/2001 |
| WO | 01/46278 | 6/2001 |
| WO | 01/48029 | 7/2001 |
| WO | 01/48034 | 7/2001 |
| WO | 01/48036 | 7/2001 |
| WO | 01/48037 | 7/2001 |
| WO | 01/48038 | 7/2001 |
| WO | 01/70878 | 9/2001 |
| WO | 01/74745 | 10/2001 |
| WO | 01/77193 | 10/2001 |
| WO | 01/81493 | 11/2001 |
| WO | 01/83498 | 11/2001 |
| WO | 01/83571 | 11/2001 |
| WO | 01/98374 | 12/2001 |
| WO | 01/98380 | 12/2001 |
| WO | 01/98381 | 12/2001 |
| WO | WO 01/96490 | 12/2001 |
| WO | WO 02/20644 | 3/2002 |
| WO | 02/35956 | 5/2002 |
| WO | 02/36651 A | 5/2002 |
| WO | 02/053668 | 7/2002 |
| WO | 02/053669 | 7/2002 |
| WO | WO 02/051931 | 7/2002 |
| WO | 02/074817 | 9/2002 |
| WO | 1377613 | 9/2002 |
| WO | 1412398 | 9/2002 |
| WO | WO 02/070572 | 9/2002 |
| WO | WO 03/033612 | 4/2003 |
| WO | WO 03/091289 | 11/2003 |
| WO | 2004/037872 A | 5/2004 |
| WO | 2004/046214 A | 6/2004 |
| WO | WO 2004/04621 | 6/2004 |
| WO | 1723184 | 10/2005 |
| WO | 1727836 | 10/2005 |

OTHER PUBLICATIONS

U.S. Appl. No. 10/686,951, filed Oct. 15, 2003, entitled "Polyolefin Adhesive Compositions and Articles Made Therefrom", Inventors: Jiang, et al.
U.S. Appl. No. 10/825,380, filed Apr. 15, 2004, entitled "Multiple Catalyst and Reactor System for Olefin Polymerization and Polymers Produced Therefrom", Inventors: Abhari et al.
U.S. Appl. No. 10/825,349, filed Apr. 15, 2004, entitled "Functionalized Olefin Polymers", Inventors: Abhari et al.
U.S. Appl. No. 10/825,348, filed Apr. 15, 2004, entitled "Polyolefin Adhesive Compositions and Articles Made Therefrom", Inventors: Abhari et al.
Abstract of DE 2316614.
Abstract of CA 2407183.
Abstract of EP 0 882 076, published on Dec. 9, 1998, entitled "Support Catalyst System".
Abstract of EP 0 882 077, published on Dec. 9, 1998, entitled "Process for Producing Alkene Polymers by Gas Phase Polymerisation".
Abstract of EP 0 882 731, published on May 31, 2000, entitled "Bridged Metallocene Compounds and Their Use as Olefin Polymerization Catalysts".
Abstract of EP 0 909 283, published on Apr. 21, 1999, entitled "Method for Producing High Melting-Point Polyolefins".
Abstract of EP 0 909 284, published on Apr. 21, 1999, entitled "Method for Producing Thermoplastic Elastomers".
Abstract of EP 1 066 330, published on Jan. 10, 2001, entitled "Catalyst System, Method for the Production Thereof, and the Utilization Thereof for the Polymerization of Olefins".
Abstract of EP 1 077 244, published on Sep. 5, 2001, entitled "Use of Reaktive Phenolic Resins in the Preparation of Highly Viscous, Self-Adhesive Materials".
Abstract of EP 1 081 203, published on Mar. 7, 2001, entitled "Use of Isocyanates in the Production of Highly Viscous Self-Sticking Compositions".
Abstract of EP 1 081 204, published on Mar. 7, 2001, entitled "Use of Sulfur for Curing High-Viscocity Pressure-Sensitive self-Adhesive Materials Based on Non-thermoplastic Elastomers".
Abstract of EP 1 089 878, published on Apr. 11, 2001, entitled "Sealable Multilayer Film Made of a Grafted Terpolymer".
Abstract of WO96/23751, published on Aug. 8, 1996, entitled "Process for Preparing Olefin Oligomers".
Abstract of WO99/05152, published on Feb. 4, 1999, entitled "Method for Producing Metallocenes".
Abstract of WO99/61487, published on Dec. 2, 1999, entitled "Catalyst System and the Use of Said Catalyst system for Polymerising Propylene".
Abstract of WO99/67094, published on Dec. 29, 1999, entitled "Sealable Multilayer Film Made of a Grafted Terpolymer".
Abstract of WO/0044799, published on Aug. 3, 2000, entitled "Organometal Compound, Catalyst System Containing Said Organometal Compound and its Use".
Abstract of WO01/14429, published on Mar. 1, 2001, entitled "Supported Catalyst Systems, Method for the Production Thereof and Method for Producing Poly-1 Alkenes with Bimodal or Multimodal Molecular Weight Distribution".
Abstract of WO01/46274, published on Jun. 28, 2001 entitled "Partly Crystalline Propylene Polymerisate Composition for Production of Biaxial-Stretched Polypropylene Films".
Abstract of WO01/48034, published on Jun. 20, 2002 entitled "Transition Metal Compound, Ligand System, Catalyst System and the Use of the Latter for the Polymerisation of Olefins".
Abstract of EP 0 602 716, published on Jun. 22, 1994, entitled "Catalyst System, Process for its Production and its Use in (Co)Polymerization of Olefins".
Abstract of EP 0 613 908, published on Sep. 7, 1994, entitled "Solid Precursor of a Catalytic System for Polymerization of Olefins, Process for its Preparation and Catalystic System Containing said Precursor".
Abstract of EP 0 627 447, published on Dec. 7, 1994, entitled "Catalyst Support and Catalyst for Alpha-Olefin Polymerization; Processes for Preparing Them and Polymerization of Alpha-Olefins in the Presence of the Catalyst".
Abstract of EP 0 643 100, published on Mar. 15, 1995, entitled "Low temperature Impact-Resistant Composition of Semicrystalline Propylene Homopolymers".
Abstract of EP 0 645 401, published on Mar. 29, 1995, entitled "Process for Producing Polyolefins".
Abstract of EP 0 646 604, published on Apr. 5, 1995, entitled "Process for Olefin Polymerization".
Abstract of EP 0 654 476, published on May 24, 1995, entitled "Metallocenes, Their Preparation and Use as Catalysts".
Abstract of EP 0 659 757, published on Jun. 28, 1995, entitled "Metallocenes".
Abstract of EP 0 661 300, published on Jul. 5, 1995, entitled "Process for the Production of Polyolefins".
Abstract of EP 0 700 934, published on Mar. 31, 1996, entitled "Supported Metallocene Catalyst System".
Abstract of EP 0 700 937, published on Mar. 13, 1996, entitled "Process for Preparing Ethylene Polymers".
Abstract of EP 0 702 030, published on Mar. 20, 1996, entitled "Process for Preparing Olefin Polymers with Large with Molecular Weight Distribution".
Abstract of EP 0 707 010, published on Sep. 29, 1999, entitled "Metallocenes".
Abstract of EP 0 719 802, published on Nov. 25, 1998, entitled "Polyolefin Was".
Abstract of EP 0 824 113, published on Feb. 18, 1998, entitled "Supported Catalyst, Process for its Preparation and its Use in Olefin Polymerization".
Abstract of EP 0 832 924, published on Apr. 1, 1998, entitled "Polyolefin Composition for the Preparation of Non-Wovens".

Abstract of EP 0 857 735, published on Jul. 26, 2000, entitled "Process for Producing a Catalyst System, Process for the (Co)Polymerization of Olefins and (Co)Polymers of at Least One Olefin".
Abstract of EP 0 864 593, published on Sep. 16, 1998, entitled "Comb-Polymers Via Metallocene Catalysis".
Abstract of EP 0 882 069, published on Dec. 9, 1998, entitled "Process for Producing Polymers of Alkenes by Suspension Polymerisation".
De Souza, et al., "Recent Advances in Olefin Polymerization Using Binary Catalyst Systems", *Macromol. Rapid Commun.*, 2001, 22, pp. 1293-1301.
Chen, et al., "Cocatalysts for Metal-Catalyzed Olefin Polymerization: Activators, Activation Processes, and Structure-Activity Relationships", *Chem. Rev.*, 2000, 100, pp. 1391-1434.
Resconi, et al., "Selectivity in Propene Polymerization with Metallocene Catalysts", *Chem. Rev.*, 2000, pp. 1253-1345.
Chien, et al., "Homogeneous Binary Zirconocenium Catalyst Systems for Propylene Polymerization. I. Isotactic/Atactic Interfacial Compatibilized Polymers Having Thermoplastic Elastomeric Properties", *Macromolecules*, 1997, 30, pp. 3447-3459.
Mun Fu Tse, "Studies of triblock copolymer-tackifying resin interactions by viscoelasticity and adhesive performance", *J. Adhesion Sci. Technol.*, 1989, vol. 3, No. 7, pp. 551-579.
Markel, et al., "Metallocene-Based Branch-Block Thermoplastic Elastomers", *Macromolecules*, vol. 33, No. 23, pp. 8541-8548.
Sun, et al., "Effect of Short Chain Branching on the Coil Dimensions of Polyolefins in Dilute Solution", *Macromolecules*, 2001, 34, pp. 6812-6820.
Huntsman REXtac APAO Polymers.
Dr. Thomas Sun, "Characterization of Polyolefins Using High Temperature Size Exclusion Chromatography Combined with Multi-Angle Laser Light Scattering and Viscometry", 1999.
"Standard Test Method for Peel Resistance of Adhesives (T-Peel Test)", Designation: D 1876-01, ASTM International, 2002.
Abstract of EP 0 248708, published on Dec. 9, 1987, entitled "Process for Controlling a Plant for Producing Cement by the Dry Way with Precalcination".
Abstract of EP 0 387 691, published on Sep. 19, 1999, entitled, "Process for Preparing a Syndiotactic Polyolefin".
Abstract of EP 0 516 018, published on Dec. 2, 1992, entitled "Process for Preparing Olefin Polymers with Large Molecular Weight Distribution".
Abstract of EP 0 516 019, published on Dec. 2, 1992, entitled "Process for Preparing Syndiotactic Polyolefins with Large Molecular Weight Distribution".
Abstract of EP 0 553 757, published on Aug. 4, 1993, entitled "Catalyst and Process for Polymerisation and Copolymerisation of Olefins".
Abstract of EP 0 557 718, published on Sep. 1, 1993, entitled "Catalyst for Olefin Polymerisation, Process for Preparing the Same and Its Sue".
Abstract of EP 0 563 917, published on Oct. 6, 1993, entitled "Catalyst for the Polymerisation of Olefins, Process for its Preparation and its Use".
Abstract of EP 0 573 120, published on Dec. 8, 1993, entitled "Process for Producing a Catalyst System, Process for the (Co)Polymerisation of Olefins and (Co)Polymers of at Least One Olefin".
Lieber and Brintzinger in "Propene Polymerization with Catalyst Mixtures Containing Different Ansa-Zirconocenes: Chain Transfer to Alkylaluminum Cocatalysts and Formation of Stereoblock Polymers", Macromolecules 2000, 33, No. 25 (pp. 9192-9199), Germany.
"Structures and Properties of Block Polymers and Multiphase Polymer Systems: An Overview of Present Status and Future Potential", S.L. Aggarwal, Sixth Biennial Manchester Polymer Symposium (UMIST Manchester, Mar. 1976).
"Structures and Properties of Block Polymers and Multiphase Polymer Systems: An Overview of Present Status and Future Potential", S.L. Aggarwal, Sixth Biennial Manchester Polymer Symposium (UMIST Manchester, Mar. 1976).
U.S. Appl. No. 11/888,876, filed Aug. 2, 2007, Inventor: Jiang, et al., entitled Multiple Catalyst System for Olefin Polymerization and Polymers Produced Therefrom (2002B140/3).
U.S. Appl. No. 11/888,870, filed Aug. 2, 2007, Inventor: Jiang, et al., entitled Multiple Catalyst System for Olefin Polymerization and Polymers Produced Therefrom (2002B140/4).

* cited by examiner

BLEND FUNCTIONALIZED POLYOLEFIN ADHESIVE

PRIORITY CLAIM

This application is a continuation-in-part of U.S. Ser. No. 10/686,951, filed Oct. 15, 2003 which claims priority from U.S. Ser. No. 60/418,482, filed Oct. 15, 2002 and U.S. Ser. No. 60/460,714, filed Apr. 4, 2003. This application is a also continuation-in-part of U.S. Ser. No. 10/687,508, filed Oct. 15, 2003 which claims priority from U.S. Ser. No. 60/418, 482, filed Oct. 15, 2002 and U.S. Ser. No. 60/460,714, filed Apr. 4, 2003.

FIELD OF THE INVENTION

This invention relates to an adhesive composition comprising a C3 to C40 olefin polymer and at least one additive (such as a tackifier, a wax, or the like), that is functionalized as a blend with a functional group. In particular, this invention relates to functionalized blends comprising a C3 to C40 olefin polymer and a tackifier, as well as processes to produce and use functionalized polyolefin adhesive blends.

BACKGROUND OF THE INVENTION

Olefin based polymers are widely used in various applications due to their being chemically inert, having low density, and low cost. However, polyolefins present non-polar surfaces to which more polar materials may not readily adhere. As such, to apply a layer of paint, adhesive, or the like to a surface comprised of an olefin based polymer such as polypropylene, a tie layer or other adhesion promoter may be required. In addition, adhesive compositions comprising olefin based polymers may not readily adhere to polar substrates such as paper, cardboard and the like.

To provide effective adhesion between polar and non-polar substances, good bonding strength and/or intimate integrity between the materials must be achieved. A tie layer or adhesion promoter may provide a bridge between a non-polar surface such as isotactic polypropylene, and a more polar surface such as Mylar® (Dupont), or paper. However, tie layers and adhesion promoters may require blends having performance over very limited criteria. Tie layers and adhesion promoters may also comprise components which may add expense and complexity to a formulation, and/or may be difficult to produce. Such factors for tie layers and adhesion promoters may render a particular formulation unsuitable for a particular use.

For example, patent application WO 02/20644 discloses structures comprising a polypropylene layer and a tie consisting of a polypropylene backbone on which polymethylmethacrylate ("PMMA") grafts are attached and a polyvinyldifluoride ("PVDF") layer. To manufacture the tie, maleic anhydride is grafted onto a polypropylene backbone and then this backbone carrying the maleic anhydride is made to react with a copolymer of methyl methacrylate ("MMA") and hydroxyethyl methacrylate ("HEMA"). The reaction between maleic anhydride and HEMA allows the PMMA graft to be fixed. However, this reaction is not easily carried out, and the MMA-HEMA copolymer may present difficulties in manufacture.

Patent application JP 08336937 A, published on Dec. 24, 1996, discloses structures similar to those above, but the tie is a graft copolymer obtained by solution polymerization of a mixture of MMA, acrylonitrile and styrene in the presence of an elastomer chosen from hydrogenated SBS (copolymers having polystyrene blocks and polybutadiene blocks), hydrogenated polybutadienes and ethylene-propylene rubbers. While this tie layer may prove facile in manufacture, the structures have insufficient properties, in particular in the presence of hydrocarbon solvents.

U.S. patent application 20040023037 is directed to a tie layer for making a polyolefin layer adhere to a PVDF layer. The tie layer comprising a graft polymer obtained by polymerization of MMA in the presence of preferably very low density polyethylene, or an ethylene-alkyl (meth)acrylate copolymer. This polymerization may take place in an extruder with or without any solvent, but may lack the integrity of more demanding conditions.

EP 033 220 is directed to graft polymers obtained by polymerization in an extruder of MMA in the presence of a polymer chosen from ethylene-propylene rubber, and blends of ethylene-propylene rubber with low density polyethylene, ethylene vinyl acetate copolymer, and blends thereof. These graft polymers may be limited in use as impact modifiers in polyvinylchloride ("PVC").

U.S. Pat. No. 4,476,283 discloses graft polymers obtained by polymerization in an extruder of MMA, styrene or acrylonitrile in the presence of an ethylene-propylene-diene copolymer/ethylene-propylene rubber blend. These graft polymers may be limited to use as a blend with styrene-butadiene rubbers or nitrile-butadiene rubbers.

There thus remains a need for an adhesive, an adhesion promoter, or a tie layer material that will intimately bond to both polar and non-polar substrates, preferably one that exhibits a superior durability of bond strength under various temperature conditions in the presence of aggressive products or conditions which is easily produced and readily available.

SUMMARY OF THE INVENTION

This invention relates to an adhesive composition comprising a blend functionalized with a functional group, wherein the blend comprises a C3 to C40 olefin polymer and at least one additive; wherein the C3 to C40 olefin polymer comprises at least 50 mol % of one or more C3 to C40 olefins, and has:

a) a Dot T-Peel of 1 Newton or more on Kraft paper;

b) an Mw of 10,000 to 100,000; and c) a branching index (g') of 0.98 or less measured at the Mz of the polymer when the polymer has an Mw of 10,000 to 60,000; or a branching index (g') of 0.95 or less measured at the Mz of the polymer when the polymer has an Mw of 10,000 to 100,000.

By "functionalized with a functional group" is meant that the blend is contacted with a functional group, and optionally a catalyst, heat, initiator, or free radical source to cause all or part of the functional group to incorporate, graft, bond to, physically attach to, and or chemically attach to one or more of the blend components, such as the C3 to C40 olefin polymer and or the additives (such as a tackifier). By "functional group" is meant any compound with a weight average molecular weight of 1000 or less that contains a heteroatom and or an unsaturation. Preferably the functional group is a compound containing a heteroatom, such as maleic anhydride. Preferred functional groups include organic acids, organic amides, organic amines, organic esters, organic anhydrides, organic alcohols, organic acid halides (such as acid chlorides, acid bromides, etc.) organic peroxides, and the like.

DETAILED DESCRIPTION

For the purposes of this invention and the claims thereto and for ease of reference, when a polymer is referred to as comprising an olefin, the olefin present in the polymer is the polymerized form of the olefin.

In a preferred embodiment the blend comprises between 1 and 90 weight % additive (preferably tackifier), preferably between 5 and 75 weight %, more preferably between 10 and 60 weight %, more preferably between 15 and 50%, based upon the weight of the blend, and between 10 and 99 weight % of the C3 to C40 olefin polymer, preferably between 95 and 25 weight %, more preferably between 40 and 90 weight %, more preferably between 85 and 50% C3 to -C40 olefin polymer.

C3 to C40 Olefin Polymers

Preferred C3 to C40 olefin polymers (also called "POA's" or "POA polymers") useful in this invention are those described in U.S. Ser. No. 10/686,951, filed Oct. 15, 2003 and U.S. Ser. No. 10/687,508, filed Oct. 15, 2003, which are incorporated by reference herein. In particular, pages 23 to 91 of U.S. Ser. No. 10/686,951 and pages 22 to 168 of U.S. Ser. No. 10/687,508 provide specific instruction on how to produce the C3 to C40 olefin polymers useful herein. In general preferred POA's comprise a polypropylene prepared utilizing two or more catalysts (typically metallocene catalysts), wherein one catalyst is selected as being capable of producing essentially atactic polypropylene (aPP), and the other metallocene catalyst is selected as being capable of producing isotactic polypropylene (iPP) under the polymerization conditions utilized. Preferably, under the polymerization conditions utilized, incorporation of aPP and iPP polymer chains may occur within the in-reactor blend such that an amount of amorphous polypropylene present in the POA polymer is grafted to isotactic polypropylene, represented herein as (aPP-g-IPP) and/or such that an amount of isotactic polypropylene present in the POA polymer is grafted to amorphous polypropylene, represented herein as (iPP-g-aPP).

Physical Properties of POA

Preferred POA polymers useful in the present invention preferably comprise one or more $C_3$ to $C_{40}$ olefins, preferably propylene, and less than 50 mole % of ethylene and have:

a) a Dot T-Peel between 1 Newton and the 10,000 Newtons; and b) a Mz/Mn of 2 to 200; and/or c) an Mw of X and a g' of Y (measured at the Mz of the polymer) according to the following Table 1:

TABLE 1

| X (Mw) | Y (g') |
|---|---|
| 100,000 or less, preferably 80,000 or less, preferably 70,000 or less, more preferably 60,000 or less, more preferably 50,000 or less, more preferably 40,000 or less, more preferably 30,000 or less, more preferably 20,000 or less, more preferably 10,000 or less. In some embodiments X is also at least 7000, more preferably 10,000, more preferably at least 15,000. | 0.9 or less, preferably 0.7 or less; preferably between 0.5-0.9 |
| 75,000 or less, preferably 70,000 or less, more preferably 60,000 or less, more preferably 50,000 or less, more preferably 40,000 or less, more preferably 30,000 or less, more preferably 20,000 or less, more preferably 10,000 or less. In some embodiments A is also at least 1000, preferably at least 2000, more preferably at least 3000, more preferably at least 4000, more preferably at least 5000, more preferably at least 7000, more preferably 10,000, more preferably at least 15,000. | 0.92 or less, preferably, 0.6 or less; preferably between 0.4-0.6- |
| 50,000 or less, more preferably 40,000 or less, more preferably 30,000 or less, more preferably 20,000 or less, more preferably 10,000 or less. In some embodiments A is also at least 1000, preferably at least 2000, more preferably at least 3000, more preferably at least 4000, more preferably at least 5000, more preferably at least 7000, more preferably 10,000, more preferably at least 15,000. | 0.95 or less, preferably 0.7 or less; preferably between 0.5-0.7- |
| 30,000 or less, preferably 25,000 or less, more preferably 20,000 or less, more preferably 15,000 or less, more preferably 10,000 or less. In some embodiments A is also at least 1000, preferably at least 2000, more preferably at least 3000, more preferably at least 4000, more preferably at least 5000, more preferably at least 7000, more preferably 10,000, more preferably at least 15,000. | 0.98 or less preferably between 0.7-0.98 |

In a preferred embodiment the POA has an Mw between 15,000 and 100,000; and a g'<($10^{-12}$ Mw$^2$-$10^{-6}$ Mw+1.0178).

In an embodiment, the g' may be 0.9 or less, 0.8 or less, 0.7 or less, 0.6 or less, 0.5 or less when measured at the Mz of the polymer.

In another embodiment the POA polymer has a peak melting point (Tm) between 40 and 250° C., or between 60 and 190° C., or between 60 and 150° C., or between 80 and 130° C. In some embodiments the peak melting point is between 60 and 160° C. In other embodiments the peak melting point is between 124-140° C. In other embodiments, the peak melting temperature is between 40-130° C.

In another embodiment the POA polymer has a viscosity (also referred to a Brookfield Viscosity or Melt Viscosity) of 90,000 mPa·sec or less at 190° C. (as measured by ASTM D 3236 at 190° C.); or 80,000 or less, or 70,000 or less, or 60,000 or less, or 50,000 or less, or 40,000 or less, or 30,000 or less, or 20,000 or less, or 10,000 or less, or 8,000 or less, or 5000 or less, or 4000 or less, or 3000 or less, or 1500 or less, or between 250 and 6000 mPa·sec, or between 500 and 5500 mPa·sec, or between 500 and 3000 mPa·sec, or between 500 and 1500 mPa·sec, and/or a viscosity of 8000 mPa·sec or less at 160° C. (as measured by ASTM D 3236 at 160° C.); or 7000 or less, or 6000 or less, or 5000 or less, or 4000 or less, or 3000 or less, or 1500 or less, or between 250 and 6000 mPa·sec, or between 500 and 5500 mPa·sec, or between 500 and 3000 mPa·sec, or between 500 and 1500 mPa·sec. In other embodiments the viscosity is 200,000 mPa·sec or less at 190° C., depending on the application. In other embodiments the POA polymer may have a viscosity of about 50,000 mPa·sec or less, depending on the application.

In another embodiment the POA polymer may also have a heat of fusion of 70 J/g or less, or 60 J/g or less, or 50 J/g or less; or 40 J/g or less, or 30 J/g or less, or 20 J/g or less and greater than zero, or greater than 1 J/g, or greater than 10 J/g, or between 20 and 50 J/g.

In another embodiment the POA polymer may also have a Shore A Hardness (as measured by ASTM 2240) of 95 or less, 70 or less, or 60 or less, or 50 or less, or 40 or less or 30 or less, or 20 or less. In other embodiments, the Shore A Hardness may be 5 or more, 10 or more, or 15 or more. In certain applications, such as packaging, the Shore A Hardness is preferably about 60-70.

In still another embodiment the POA polymer may have a Mz/Mn of 2 to 200, preferably 2 to 150, preferably 10 to 100.

In another embodiment the POA polymer may have a Shear Adhesion Fail Temperature (SAFT—as measured by ASTM 4498) of 200° C. or less, or of 40° C. to 150° C., or 60° C. to 130° C., or 65° C. to 110° C., or 70° C. to 80° C. In certain embodiments SAFT's of 130° C. to 140° C. may be preferred.

In another embodiment the POA polymer may have a Dot T-Peel of between 1 Newton and 10,000 Newtons, or 3 and 4000 Newtons, or between 5 and 3000 Newtons, or between 10 and 2000 Newtons, or between 15 and 1000 Newtons. As used herein, Dot T-Peel is determined according to ASTM D 1876, except that the specimen is produced by combining two 1 inch by 3 inch (2.54 cm×7.62 cm) Kraft paper substrate cut outs with a dot of adhesive with a volume that, when compressed under a 500 gram weight occupies about 1 square inch of area (1 inch=2.54 cm). Once made all the specimens are pulled apart in side by side testing (at a rate of 2 inches per minute) by a device which records the destructive force of the insult being applied. The maximum force achieved for each sample tested was recorded and averaged, thus producing the average maximum force, which is reported as the Dot T-Peel.

In another embodiment the POA polymer may have a set time of several days to about 0.1 seconds or less, or 60 seconds or less, or 30 seconds or less, or seconds or less, or 15 seconds or less, or 10 seconds or less, or 5 seconds or less, or 4 seconds or less, or 3 seconds or less, or 2 seconds or less, or 1 second or less.

In another embodiment the POA polymer may have a Mw/Mn of 2 to 75, or 4 to 60, or 5 to 50, or 6 to 20.

In yet another embodiment, the POA polymer may have an Mz of 1,000,000 or less, preferably 15,000 to 1,000,000, or 20,000 to 800,000, or 25,000 to 350,000.

In another embodiment the POA polymer may also have a strain at break (as measured by ASTM D-1708 at 25° C.) of 50 to 1000%, preferably 80 to 200%. In some other embodiments the strain at break is 100 to 500%.

In another embodiment, the POA polymer has a tensile strength at break (as measured by ASTM D-1708 at 25° C.) of 0.5 MPa or more, alternatively 0.75 MPa or more, alternatively 1.0 MPa or more, alternatively 1.5 MPa or more, alternatively 2.0 MPa or more, alternatively 2.5 MPa or more, alternatively 3.0 MPa or more, alternatively 3.5 MPa or more.

In another embodiment, the POA polymer also has a crystallization point (Tc) between 20° C. and 110° C. In some embodiments the Tc is between 70° C. to 100° C. In other embodiments the Tc is between 30° C. and 80° C. In other embodiments the Tc is between 20° C. and 50° C.

In some embodiments the POA polymers may have a slope of −0.1 or less, preferably −0.15 or less, more preferably −0.25 or less in the trace of complex viscosity versus temperature (as measured by ARES dynamic mechanical spectrometer operating at a frequency of 10 rad/s, with a strain of 20% under a nitrogen atmosphere, and a cooling rate of 10° C./min) over the range of temperatures from Tc+10° C. to Tc+40° C. The slope is defined for use herein as a derivative of log (complex viscosity) with respect to temperature.

In another embodiment the POA polymer has a Tc that is at least 10° C. below the Tm, preferably at least 20° C. below the Tm, preferably at least 30° C. below the Tm, more preferably at least 35° C. below the Tm.

In another embodiment some POA polymers may have a melt index ratio ($I_{10}/I_2$) of 6.5 or less, preferably 6.0 or less, preferably 5.5 or less, preferably 5.0 or less, preferably 4.5 or less, preferably between 1 and 6.0. ($I_{10}$ and $I_2$ are measured according to ASTM 1238 D, 2.16 kg, 190° C.).

In another embodiment some POA polymers may have a melt index (as determined by ASTM 1238 D,2.16 kg, 190 deg. C.) of 25 dg/min or more, preferably 50 dg/min or more, preferably 100 dg/min or more, more preferably 200 dg/min or more, more preferably 500 dg/mn or more, more preferably 2000 dg/min or more. In another embodiment the polymer has a melt index of 900 dg/min or more.

In another embodiment the POA polymer may have a range of crystallization of 10 to 60° C. wide, preferably 20 to 50° C., preferably 30 to 45° C. in the DSC traces. In DSC traces where there are two or more non-overlapping peaks, then each peak has a range of crystallization of 10 to 60° C. wide, preferably 20 to 50° C., preferably 30 to 45° C. in the DSC traces.

In another embodiment the POA polymer may have a molecular weight distribution (Mw/Mn) of at least 2, preferably at least 5, preferably at least 10, even more preferably at least 20.

In another embodiment the POA polymer may have a unimodal, bimodal, or multimodal molecular weight distribution (Mw/Mn) distribution of polymer species as determined by Size Exclusion Chromatography (SEC), also referred to herein as Gel Permeation Chromatography (GPC). By bimodal or multimodal is meant that the GPC trace has more than one peak or inflection points. An inflection point is that point where the second derivative of the curve changes in sign (e.g., from negative to positive or vice versus).

In another embodiment the POA polymer may have an energy of activation of 8 to 15 cal/mol. Energy of activation being calculated using the relationships of complex viscosity and temperature over the region where thermal effects are responsible for viscosity increase (assuming an Arrhenius-like relationship).

In another embodiment the POA polymers may have a crystallinity of at least 5%, preferably at least 10%, more preferably at least 20%.

In another embodiment the POA polymer may also have one or more of the following:
  a) a peak melting point between 60 and 190° C., or between about 60 and 150° C., or between 80 and 130° C.; and/or
  b) a viscosity of 8000 mPa·sec or less at 190° C. (as measured by ASTM D 3236 at 190° C.); or 5000 or less, or 4000 or less, or 3000 or less, or 1500 or less, or between 250 and 6000 mPa·sec, or between 500 and 5500 mPa·sec, or between 500 and 3000 mPa·sec, or between 500 and 1500 mPa·sec, or a viscosity of 8000 mPa·sec or less at 160° C. (as measured by ASTM D 3236 at 160° C.); or 7000 or less, or 6000 or less, or 5000 or less, or 4000 or less, or 3000 or less, or 1500 or less, or between 250 and 6000 mPa·sec, or between 500 and 5500 mPa·sec, or between 500 and 3000 mPa·sec, or between 500 and 1500 mPa·sec; and/or c) an $H_f$ (Heat of fusion) of 70 J/g or less, or 60 J/g or less, or 50 J/g or less; or 40 J/g or less, or 30 J/g or less, or 20 J/g or less and greater than zero, or greater than 1 J/g, or greater than 10 J/g, or between 20 and 50 J/g; and or d) a Shore A Hardness (as measured by ASTM 2240) of 90 or less, or 80 or less, or 70 or less, or 60 or less or 50 or less, or 40 or less; and or e) a Shear Adhesion Fail Temperature (SAFT—as measured by ASTM 4498) of 40 to 150° C., or 60 to 130° C., or 65 to 110° C., or 70-80° C.; and or f) a Dot T-Peel of between 1 Newton and 10,000 Newtons or 3 and 4000 Newtons, or between 5 and 3000 Newtons, or between 10 and 2000 Newtons, or between 15 and 1000 Newtons; and/or g) a set time of several days to 0.1 second, or 60 seconds or less, or 30 seconds or less, or 20 seconds or less, or 15 seconds or less, or 10 seconds or less, or 5 seconds or less, or 4 seconds or less, or 3 seconds or less, more or 2 seconds or less, or 1 second or less; and or h) an Mw/Mn of greater than 1 to 75, or 2 to 60, or 2 to 50, or 3 to 20; and/or i) an Mz of 1,000,000 or less, preferably 15,000 to 500,000, or 20,000 to 400,000, or 25,000 to 350,000.

Useful combinations of features include POA polymers having a Dot T-Peel of between 1 Newton and 10,000 Newtons, or 3 and 4000 Newtons, or between 5 and 3000 Newtons, or between 10 and 2000 Newtons, or between 15 and 1000 Newtons and:

1. an Mw of 30,000 or less, a peak melting point between 60 and 190° C., a Heat of fusion of 1 to 70 J/g, a branching index (g') of 0.90 or less measured at the Mz of the polymer; and a melt viscosity of 8000 mPa·sec or less at 190° C.; or
2. an Mz of 20,000 to 500,000 and a SAFT of 60 to 150° C.; or
3. an Mz/Mn of 2-200 and a set time of 2 seconds or less; or
4. an $H_f$ (heat of fusion) of 20 to 50 J/g, an Mz or 20,000-500,000 and a shore hardness of 50 or less; or
5. an Mw/Mn of greater than 1 to 50, a viscosity of 5000 or less mPa·sec at 190° C.; or
6. an Mw of 50,000 or less, a peak melting point between 60 and 190° C., a heat of fusion of 2 to 70 J/g, a branching index (g') of 0.70 or less measured at the Mz of the polymer, and a melt viscosity of 8000 mPa·sec or less at 190° C.

In a preferred embodiment, the POA polymer comprises amorphous, crystalline and branch-block molecular structures.

In a preferred embodiment the POA polymer comprises at least 50 weight % propylene, preferably at least 60% propylene, alternatively at least 70% propylene, alternatively at least 80% propylene. In another embodiment the POA polymer comprises propylene and 15 mole % ethylene or less, preferably 10 mole % ethylene or less, more preferably 9 mole % ethylene or less, more preferably 8 mole % ethylene or less, more preferably 7 mole % ethylene or less, more preferably 6 mole % ethylene or less, more preferably 5 mole % ethylene or less, more preferably 4 mole % ethylene or less, more preferably 3 mole % ethylene or less, more preferably 2 mole % ethylene or less, more preferably 1 mole % ethylene or less.

In another embodiment the POA polymer comprises less than 5 mole % of ethylene, preferably less than 4.5 mole % ethylene, preferably less than 4.0 mole % ethylene, alternatively less than 3.5 mole % ethylene, alternatively less than 3.0 mole % ethylene, alternatively less than 2.5 mole % ethylene, alternatively less than 2.0 mole % ethylene, alternatively less than 1.5 mole % ethylene, alternatively less than 1.0 mole % ethylene, alternatively less than 0.5 mole % ethylene, alternatively less than 0.25 mole % ethylene, alternatively 0 mole % ethylene.

In another embodiment the POA polymer has a glass transition temperature (Tg) as measured by ASTM E 1356 of 5° C. or less, preferably 0° C. or less, preferably −5° C. or less, alternatively between −5° C. and −40° C., alternatively between −5° C. and −15° C.

In another embodiment the POA polymer has an amorphous content of at least 50%, alternatively at least 60%, alternatively at least 70%, even alternatively between 50 and 99%. Percent amorphous content is determined using Differential Scanning Calorimetry measurement according to ASTM E 794-85.

In another embodiment the POA polymer has a crystallinity of 40% or less, alternatively 30% or less, alternatively 20% or less, even alternatively between 10% and 30%. Percent crystallinity content is determined using Differential Scanning Calorimetry measurement according to ASTM E 794-85. In another embodiment, the POA polymers described herein have a percent crystallinity of between 5 and 40%, alternatively between 10 to 30%.

In another embodiment the POA polymer may have a molecular weight distribution (Mw/Mn) of at least 1.5, preferably at least 2, preferably at least 5, preferably at least 10, even alternatively at least 20. In other embodiments the Mw/Mn is 20 or less, 10 or less, even 5 or less. Molecular weight distribution generally depends on the catalysts used and process conditions such as temperature, monomer concentration, catalyst ratio, if multiple catalysts are used, and the presence or absence of hydrogen. Hydrogen may be used at amounts up to 2 weight %, but is preferably used at levels of 50 to 500 ppm.

In another embodiment the POA polymer may be found to have at least two molecular weights fractions present at greater than 2 weight %, preferably greater than 20 weight %, each based upon the weight of the polymer as measured by Gel Permeation Chromatography. The fractions can be identified on the GPC trace by observing two distinct populations of molecular weights. An example would be a GPC trace showing a peak at 20,000 Mw and another peak at 50,000 Mw where the area under the first peak represents more than 2 weight % of the polymer and the area under the second peak represents more than 2 weight % of the polymer.

In another embodiment the POA polymer may have 20 weight % or more (based upon the weight of the starting polymer) of hexane room temperature soluble fraction, and 70 weight % or less, preferably 50 weight % or less of Soxhlet boiling heptane insolubles, based upon the weight of the polymer. Soxhlet heptane insoluble refers to one of the fractions obtained when a sample is fractionated using successive solvent extraction technique. The fractionations are carried out in two steps: one involves room temperature solvent extraction, the other soxhlet extraction. In the room temperature solvent extraction, about one gram of polymer is dissolved in 50 ml of solvent (e.g., hexane) to isolate the amorphous or very low molecular weight polymer species. The mixture is stirred at room temperature for about 12 hours. The soluble fraction is separated from the insoluble material using filtration under vacuum. The insoluble material is then subjected to a Soxhlet extraction procedure. This involves the separation of polymer fractions based on their solubility in various solvents having boiling points from just above room temperature to 110° C. The insoluble material from the room temperature solvent extraction is first extracted overnight with a solvent such as hexane and heptane (Soxhlet); the extracted material is recovered by evaporating the solvent and weighing the residue. The insoluble sample is then extracted with a solvent having higher boiling temperature such as heptane and after solvent evaporation, it is weighed. The insolubles and the thimble from the final stage are air-dried in a hood to evaporate most of the solvent, then dried in a nitrogen-purged vacuum oven. The amount of insoluble left in the thimble is then calculated, provided the tare weight of the thimble is known.

In another embodiment, the POA polymers may have a heptane insoluble fraction 70 weight % or less, based upon the weight of the starting polymer, and the heptane insoluble fraction has branching index g' of 0.9 (preferably 0.7) or less as measured at the Mz of the polymer. In a preferred embodiment the composition may also have at least 20 weight % hexane soluble fraction, based upon the weight of the starting polymer. In another embodiment, the POA polymers of the present invention may have a heptane insoluble fraction 70 weight % or less, based upon the weight of the starting polymer and a Mz between 20,000 and 5000,000 of the heptane insoluble portion. In a preferred embodiment the composition also has at least 20 weight % hexane soluble fraction, based upon the weight of the starting polymer. In another embodiment the POA polymers have a hexane soluble portion of at least 20 weight %, based upon the weight of the starting polymer.

In another embodiment the POA polymer comprises propylene and 15 mole % ethylene or less, preferably 10 mole % ethylene or less, more preferably 9 mole % ethylene or less, more preferably 8 mole % ethylene or less, more preferably 7 mole % ethylene or less, more preferably 6 mole % ethylene or less, more preferably 5 mole % ethylene or less, more preferably 4 mole % ethylene or less, more preferably 3 mole % ethylene or less, more preferably 2 mole % ethylene or less, more preferably 1 mole % ethylene or less.

In another embodiment the POA polymer comprises less than 5 mole % of ethylene, preferably less than 4.5 mole % ethylene, preferably less than 4.0 mole % ethylene, alternatively less than 3.5 mole % ethylene, alternatively less than 3.0 mole % ethylene, alternatively less than 2.5 mole % ethylene, alternatively less than 2.0 mole % ethylene, alternatively less than 1.5 mole % ethylene, alternatively less than 1.0 mole % ethylene, alternatively less than 0.5 mole % ethylene, alternatively less than 0.25 mole % ethylene, alternatively 0 mole % ethylene.

For ease of reference the portion of the POA polymer produced by one of the catalyst may have at least 10% crystallinity may also be referred to as the "semi-crystalline polymer" and the polymer produced by another of the catalyst may have a crystallinity of less than 5%, which may be referred to as the "amorphous polymer."

In another embodiment of this invention the POA polymer may have a characteristic three-zone complex viscosity-temperature pattern. The temperature dependence of complex viscosity was measured using ARES dynamic mechanical spectrometer operating at a frequency of 10 rad/s, with a strain of 20% under a nitrogen atmosphere, and a cooling rate of 10° C./min. The sample was first molten then gradually cooled down to room temperature while monitoring the build-up in complex viscosity. Above the melting point, which is typical of polymer processing temperature, the complex viscosity is relatively low (Zone I) and increases gradually with decreasing temperature. In zone II, a sharp increase in complex viscosity appears as temperature is dropped. The third zone (Zone III) is the high complex viscosity zone, which appears at lower temperatures corresponding to application (end use) temperatures. In Zone III the complex viscosity is high and varies slightly with further decrease in temperature. Such a complex viscosity profile provides, in hot melt adhesive applications, a desirable combination of long opening time at processing temperatures and fast set time at lower temperatures.

In a preferred embodiment, the POA polymers have less than 1 mol % ethylene, have at least 2 mol % $(CH_2)_2$ units, preferably 4 mol %, preferably 6 mol %, more preferably 8 mol %, more preferably 10 mol %, more preferably 12 mol %, more preferably 15 mol %, more preferably 18 mol %, more preferably 5 mol % as measured by Carbon 13 NMR as described below.

In an another embodiment, the POA polymers may have between 1 and 10 mol % ethylene, have at least 2+X mol % $(CH_2)_2$ units, preferably 4+X mol %, preferably 6+X mol %, more preferably 8+X mol %, more preferably 10+X mol %, more preferably 12+X mol %, more preferably 15+X mol %, more preferably 18+X mol %, more preferably 20+X mol %, where X is the mole % of ethylene, and the $(CH_2)_2$ units are determined by Carbon 13 NMR as described below.

In a preferred embodiment, the POA polymers may have less than 1 mol % ethylene, have an amorphous component (i.e., defined to be that portion of the polymer composition that has a crystallinity of less than 5%) which contains at least 3 mol % $(CH_2)_2$ units, preferably 4 mol %, preferably 6 mol %, more preferably 8 mol %, more preferably 10 mol %, more preferably 12 mol %, more preferably 15 mol %, more preferably 18 mol %, more preferably 20 mol % as measured by Carbon 13 NMR as described below.

In an another embodiment, the POA polymers may have between 1 and 10 mol % ethylene, have an amorphous component (which is defined to be that portion of the polymer composition that has a crystallinity of less than 5%) which contains at least 3+X mol % $(CH_2)_2$ units, preferably 4+X mol %, preferably 6+X mol %, more preferably 8+X mol %, more preferably 10+X mol %, more preferably 12+X mol %, more preferably 15+X mol %, more preferably 18+X mol %, more preferably 20+X mol %, where X is the mole % of ethylene, and the $(CH_2)_2$ units are determined by Carbon 13 NMR as described below.

Additives

Suitable additives for use in the present invention include, but are not limited to, tackifiers, which may comprise aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, hydrogenated rosin acids, and hydrogenated rosin esters. In some embodiments the tackifier may be hydrogenated.

In other embodiments, the tackifier may be non-polar. (non-polar meaning that the tackifier is substantially free of monomers having polar groups. Preferably, the polar groups are not present, however if they are present, the polar groups are preferably present at less than about 5 weight % of the non-polar tackifier, preferably not more that 2 weight %, even more preferably no more than 0.5 weight %. In some embodiments the tackifier may have an R and B softening point (Ring and Ball, as measured by ASTM E-28) of 80° C. to 150° C., preferably 100° C. to 130° C. In another embodiment the resins is liquid and has an R and B softening point of between 10 and 70° C.

Preferred hydrocarbon resins for use as tackifiers or adhesion modifiers include resins such as $C_5/C_6$ terpene resins, styrene terpenes, alpha-methyl styrene terpene resins, $C_9$ terpene resins, aromatic modified $C_5/C_6$, aromatic modified cyclic resins, aromatic modified dicyclopentadiene based resins or mixtures thereof. Additional preferred resins include those described in WO 91/07472, U.S. Pat. No. 5,571,867, U.S. Pat. No. 5,171,793 and U.S. Pat. No. 4,078,132. These resins may be obtained from the cationic polymerization of compositions containing one or more of the following monomers: $C_5$ diolefins (such as 1-3 pentadiene, isoprene, and the like); $C_5$ olefins (such as 2-methylbutenes, cyclopentene, and the like); $C_6$ olefins (such as hexene), $C_9$ vinylaromatics (such as styrene, alpha methyl styrene, vinyltoluene, indene, methyl indene, and the like); cyclics (such as dicyclopentadiene, methyldicyclopentadiene, and the like); and or terpenes (such as limonene, carene, thujone, and the like).

Other examples include resins obtained by the thermal polymerization of dicyclopentadiene, and/or the thermal polymerization of dimers or oligomers of cyclopentadiene and/or methylcyclopentadiene, optionally with vinylaromatics (such as styrene, alpha-methyl styrene, vinyl toluene, indene, methyl indene, and the like).

The resins obtained after polymerization and separation of unreacted materials, can be hydrogenated if desired. Examples of preferred resins include those described in U.S. Pat. No. 4,078,132; WO 91/07472; U.S. Pat. No. 4,994,516; EP 0 046 344 A; EP 0 082 726 A; and U.S. Pat. No. 5,171,793.

The inventive blend prior to functionalization may comprise greater than 0.1 wt % tackifier, based upon the weight of the blend. In a preferred embodiment, the blend, prior to functionalization, may include less than about 90%, more preferably less than about 80%, more preferably less than about 70%, more preferably less than about 60%, more preferably less than about 50%, more preferably less than about 40%, more preferably less than about 30%, more preferably less than about 20%, more preferably less than about 10%, more preferably less than about 9%, more preferably less than about 8%, more preferably less than about 7%, more preferably less than about 6%, more preferably less than about 5%, more preferably less than about 4%, more preferably less than about 3%, more preferably less than about 2%, more preferably less than about 1% tackifier, based on the total weight of the blend.

In another embodiment the blend comprises between 1 and 90 weight % tackifier, preferably between 5 and 75 weight %, more preferably between 10 and 60 weight %, more preferably between 15 and 50% of tackifier, based upon the weight of the blend.

Other Additives and Components of the Blend

The blend of the present invention, either prior to, and/or after functionalization of the blend (i.e., blend functionalization), may be blended, mixed and/or combined with other additives (e.g., components, ingredients, and the like) to form an adhesive formulation.

Crosslinking Agents

In another embodiment the blend may further comprises a crosslinking agent. Preferred crosslinking agents include those having functional groups that can react with the acid or anhydride group. Preferred crosslinking agents include alcohols, multiols, amines, diamines and/or triamines. Particular examples of crosslinking agents useful in this invention include polyamines such as ethylenediamine, diethylenetriamine, hexamethylenediamine, diethylaniinopropylamine, and/or menthanediamine.

The blend may also be functionalized with an hydrolyzable unsaturated silane which may be utilized as a starting material for a crosslinked polypropylene or a crosslinked propylene copolymer. In this case, the hydrolyzable unsaturated silane units may be present in the functionalized blend preferably in an amount of from 0.1 to 50% by weight, more preferably from 0.1 to 10% by weight based on weight of the blend after functionalization.

The adhesive composition may then be heated in the presence of water. In order to effectively form the crosslinking with the aid of water, a catalyst may also be added. Examples of suitable catalysts include hydroxides and/or oxides of alkaline metals and alkaline earth metals, ammonia, amines, organic and inorganic acids, salts thereof, alkoxysilicons, and silicon hydrides. In some cases, the catalysts may be used directly without any additional treatment. The amount of the catalyst is usually from 0.001 to 1 wt %, based on the weight of the functionalized blend.

A temperature at which the above-mentioned adhesive composition may be heated in the presence of water is from about 50° C. to 200° C., preferably from 80° C. to 120° C. Water may be in the form of steam, or the composition may be immersed into boiling water.

In the thus crosslinked functionalized blend, the ratio of the boiling xylene-insoluble component to this functionalized blend is preferably from 5 to 100% by weight.

In another embodiment, the adhesive composition comprising a functionalized blend on which hydrolyzable unsaturated silane is grafted can be blended with a phenolic antioxidant, a sulfide hydroperoxide decomposer and a polyvalent amine to prepare a water-crosslinkable composition.

Many kinds of phenolic antioxidants are known and commercially available. A preferred example of a phenolic antioxidant is a substituted phenol such as 2,6-di-t-butylphenol in which a hydrogen atom at 2 and/or 6 position is substituted by an alkyl residue. Typical examples of the phenolic antioxidant include 2,6-di-t-butyl-p-cresol, 2,4,6-tri-t-butylphenol, vitamin E, 2-t-butyl-6-(3'-t-butyl-5'-methyl-2'-hydroxybenzyl)-4-methylphenyl acrylate, 2,2'-methylene-bis(4-methyl-6-t-butylphenyl), 2,2'-methylene-bis(4-ethyl-6-t-butyl-phenol), 2,2'-methylene-bis(6-cyclohexyl-4-methylphenol), 1,6-hexanediol-bis([3-(3,5-di-t-butyl[4-hydroxyphenyl])] propionate and pentaerythrityl-tetrakis-[3-(3,5-di-t-butyl-4-hydroxyphenyl)] propionate.

A preferable example of the sulfide hydroperoxide decomposer is an ester of a thioether, and typical examples of the commercially available sulfide hydroperoxide decomposer include diesters of 3,3'-thiodipropionic acid and higher alcohols such as lauryl alcohol, tridecyl alcohol and stearyl alcohol.

Examples of the polyvalent amine include melamine, its derivatives, a hydrazide compound such as oxalic acid-bis (benzylidenehydrazide) and a triazole compound such as 3-(N-salicyloyl)amino-1,2,4-triazole.

The amount of each of these additives to be added is such that the weight ratio of the additive to the functionalized blend is preferably 1/1000 to 1/100000, more preferably 1/500 to 1/10000.

No particular restriction is put on the mixing manner of the functionalized blend and the stabilizer, which may be dry mixed utilizing, for example, a Henschel mixer, followed by melting and/or granulation.

To the above-mentioned composition, there can be added a neutralizing agent such as calcium stearate, magnesium hydroxide, aluminum hydroxide or hydrotalcite, and a nucleating agent such as a salt of benzoic acid, sodium-2,2'-methylene-bis(4,6-di-t-butylphenyl)phosphate and benzyl sorbitol, and the like, in addition to the above-mentioned stabilizer.

The adhesive composition may further comprise additives such as fillers, antioxidants, adjuvants, adhesion promoters, oils, and/or plasticizers. Preferred fillers include titanium dioxide, calcium carbonate, barium sulfate, silica, silicon dioxide, carbon black, sand, glass beads, mineral aggregates, talc, clay and the like. Preferred antioxidants include phenolic antioxidants, such as Irganox 1010, Irganox, 1076 both available from Ciba-Geigy. Preferred oils include paraffinic or napthenic oils such as Primol 352, or Primol 876 available from ExxonMobil Chemical France, S.A. in Paris, France. Preferred plasticizers include polybutenes, such as Parapol 950 and Parapol 1300 formerly available from ExxonMobil Chemical Company in Houston Tex. Other preferred additives include block, antiblock, pigments, processing aids, UV stabilizers, hindered amine light stabilizers, UV absorbers, neutralizers, lubricants, surfactants and/or nucleating agents. Preferred additives include silicon dioxide, titanium dioxide, polydimethylsiloxane, talc, dyes, wax, calcium sterate, carbon black, low molecular weight resins and glass beads. Preferred adhesion promoters include polar acids, polyaminoamides (such as Versamid 115, 125, 140, available from Henkel), urethanes (such as isocyanate/hydroxy terminated polyester systems, e.g. bonding agent TN/Mondur Cb-75 (Miles, Inc.), coupling agents, (such as silane esters (Z-6020 from Dow Coming)), titanate esters (such as Kr-44 available from Kenrich), reactive acrylate monomers (such as sarbox SB-600 from Sartomer), metal acid salts (such as Saret 633 from Sartomer), polyphenylene oxide, oxidized polyolefins, acid modified polyolefins, and preferably, anhydride modified polyolefins.

In another embodiment the adhesive composition may be combined with less than 3 wt % anti-oxidant, less than 3 wt % flow improver, less than 10 wt % wax, and or less than 3 wt % crystallization aid.

Other optional components that may be combined with the adhesive composition as disclosed herein include plasticizers, and/or other additives such as oils, surfactants, fillers, color masterbatches, and the like. Preferred plasticizers include mineral oils, polybutenes, phthalates and the like. Particularly preferred plasticizers include phthalates such as di-iso-undecyl phthalate (DIUP), di-iso-nonylphthalate (DINP), dioctylphthalates (DOP) and/or the like. Particularly preferred oils include aliphatic naphthenic oils.

Other additives or components that may be combined with the blend of this invention, either prior to or after functionalization include low molecular weight products such as wax, oil or low Mn polymer, (low meaning below Mn of 5000, preferably below 4000, more preferably below 3000, even more preferably below 2500). Preferred waxes may include both polar and non-polar waxes, functionalized waxes, polypropylene waxes, polyethylene waxes, and wax modifiers. Preferred waxes include ESCOMER™ 101. Preferred functionalized waxes include those modified with an alcohol, an acid, a ketone, an anhydride and the like. Preferred examples include waxes modified by methyl ketone, maleic anhydride or maleic acid. Preferred oils include aliphatic napthenic oils, white oils, or the like. Preferred low Mn polymers include polymers of lower alpha olefins such as propylene, butene, pentene, hexene and the like. A particularly preferred polymer includes polybutene having an Mn of less than 1000. An example of such a polymer is available under the trade name PARAPOL™ 950 from ExxonMobil Chemical Company. PARAPOL™ 950 is a liquid polybutene polymer having an Mn of 950 and a kinematic viscosity of 220cSt at 100° C., as measured by ASTM D 445. In some embodiments the polar and non-polar waxes are used together in the same composition.

In some embodiments, however, wax may not be desired and may thus be present at less than 10 weight %, preferably less than 5 weight %, more preferably less than 1 weight %, more preferably less than 0.5 weight %, based upon the weight of the composition.

In another embodiment the composition of this invention may have less than 50 weight % total of any combination of additives described above, preferably less than 25 weight %, preferably less than 20 weight %, preferably less than 15 weight %, preferably less than 10 weight %, preferably less than 5 weight %, based upon the total weight of component 1 and component 2, and the additives.

In another embodiment, the composition of this invention may be blended with such additives as elastomers (preferred elastomers include all natural and synthetic rubbers, including those defined in ASTM D1566). In a preferred embodiment, elastomers may be blended with the composition of the present invention to form rubber toughened compositions. In a particularly preferred embodiment, the rubber toughened composition is a two (or more) phase system where the rubber is a discontinuous phase and the inventive composition forms the continuous phase. Examples of preferred elastomers include one or more of the following: ethylene propylene rubber, ethylene propylene diene monomer rubber, neoprene rubber, styrenic block copolymer rubbers (including SI, SIS, SB, SBS, SIBS , SEBS, SEPS, and the like (S is styrene, I is isoprene, B is butadiene, EB is ethylenebutylene, EP is ethylenepropylene), butyl rubber, halobutyl rubber, copolymers of isobutylene and para-alkylstyrene, halogenated copolymers of isobutylene and para-alkylstyrene. This blend may be combined with the tackifiers and/or other additives as described above.

In another embodiment the blend may include such additives as impact copolymers. Impact copolymers are defined to be a blend of isotactic PP and an elastomer such as an ethylene-propylene rubber. In a preferred embodiment the blend is a two (or more) phase system where the impact copolymer is a discontinuous phase and the blend as described above, is the continuous phase.

In another embodiment the polymer produced by this invention may be blended with additives which include ester polymers. In a preferred embodiment the blend is a two (or more) phase system where the polyester is a discontinuous phase and the blend is the continuous phase.

In another embodiment, the blend may include a polypropylene copolymer or a blend of discrete polymers as an additive or additives. Such blends may include two or more polymers such as polypropylene—polyethylene copolymers, two or more polypropylene copolymers. The polymers include: random copolymers (RCP) and impact copolymers (ICP) also called heterophasic copolymers or block copolymers. RCPs are usually produced by copolymerizing in a single reactor process propylene with other monomers such as ethylene, butene and higher alpha-olefins, the most common one being ethylene. Typical ethylene content for these copolymers range from 3-4 mole % up to 14-17 mole %.

ICPs are sequentially produced in processes involving series reactors with an isotactic polypropylene being produced in the first reactor and ethylene being fed to the second reactor to generate an ethylene propylene rubber. Typical ethylene propylene rubber content ranges from 20% to 50% and even up to 70% when Catalloy technology developed by Himont is used. At such high rubber contents, the copolymers may be referred to as high alloy copolymers. In the case of these ICPs, the melting point is still around 160° C. as they still contain an isotactic polypropylene fraction. The flexural modulus is typically between 800 and 1300 MPa. The high alloy copolymers have flexural modulus comprised between 90 and 500 MPa.

In an embodiment, in addition to the POA polymer and the tackifier, the blend may also include an alpha-olefin homopolymer or copolymer containing no graft component. If desired, the alpha-olefin homopolymers may have various molecular weight characteristics, may be random and/or block copolymers of alpha-olefins themselves. Examples of the alpha-olefin include ethylene and alpha-olefins having 4 to 20 carbon atoms in addition to propylene. The homopolymers and copolymers of these alpha-olefins can be manufactured by various known methods, and may be commercially available under various trade names.

Propylene ethylene copolymers suitable for use in this invention may also have unique propylene tacticity as measured by % meso triad, as shown in detail in U.S. Ser. No. 09/108,772, filed Jul. 1, 1998, fully incorporated herein by reference, which differ in % meso triad for any given ethylene content when compared to U.S. Pat. No. 5,504,172.

In an preferred embodiment, the blend, before or after blend functionalization, may comprise a random copolymer produced by copolymerizing propylene and an alpha olefin, wherein the random copolymer has a crystallinity of from 0.1 to 50% from isotactic polypropylene sequences, a propylene content from 68 to 92 mole percent; a comonomer content from 8 to 32 mole percent; a melting point from 25° C. to 105° C.; and a heat of fusion of less than 45 J/g, as described on pages 4-26 in Patent Publication No. WO/02/36651 A1, Published May 10, 2002, which pages are incorporated by reference herein.

Functionalization of the Blend

In a preferred embodiment this invention relates to a blend of a C3 to C40 olefin polymer and at least one additive, where the blend has been functionalized. Preferred blends comprise one or more POA polymers and tackifier, where the combination of the POA and the tackifier has been functionalized with a functional group. By functionalized (or grafted) it is meant that various functional groups are incorporated, grafted, bonded to, physically and/or chemically attached to one or more of the blend components, preferably the polymer backbone of the POA polymers, the tackifier, the other additives, or all of the above.

In one embodiment, functional groups may be grafted onto the components of the blend utilizing radical copolymerization of a functional group, also referred to herein as graft copolymerization. The end result being a functionalized blend comprising a POA polymer or blend of POA polymers, a tackifier or blend of tackifiers, and other additives as defined above.

Examples of suitable unsaturated compounds which may be used to functionalize the blend include unsaturated carboxylic acids, esters of the unsaturated carboxylic acids, acid anhydrides, di-esters, salts, amides, imides, aromatic vinyl compounds hydrolyzable unsaturated silane compounds and unsaturated halogenated hydrocarbons.

Preferred examples of unsaturated carboxylic acids and acid derivatives include, but are not limited to maleic anhydride, citraconic anhydride, 2-methyl maleic anhydride, 2-chloromaleic anhydride, 2,3-dimethylmaleic anhydride, bicyclo[2,2,1]-5-heptene-2,3-dicarboxylic anhydride and 4-methyl-4-cyclohexene-1,2-dicarboxylic anhydride, acrylic acid, methacrylic acid, maleic acid, fumaric acid, itaconic acid, citraconic acid, mesaconic acid, crotonic acid, bicyclo (2.2.2)oct-5-ene-2,3-dicarboxylic acid anhydride, 1,2,3,4,5, &g, lo-octahydronaphthalene-2,3-dicarboxylic acid anhydride, 2-oxa-1,3-diketospiro(4.4)non-7-ene, bicyclo(2.2.1) hept-5-ene-2,3-dicarboxylic acid anhydride, maleopimaric acid, tetrahydrophtalic anhydride, norbom-5-ene-2,3-dicarboxylic acid anhydride, nadic anhydride, methyl nadic anhydride, himic anhydride, methyl himic anhydride, and x-methyl-bicyclo(2.2.1)hept-5-ene-2,3-dicarboxylic acid anhydride (XMNA).

Examples of the esters of the unsaturated carboxylic acids include methyl acrylate, ethyl acrylate, butyl acrylate, methyl methacrylate, ethyl methacrylate and butyl methacrylate.

Hydrolyzable unsaturated silane compounds useful as functional groups herein may include radical polymerizable unsaturated group and an alkoxysilyl group or a silyl group in its molecule, such that the compound has a hydrolyzable silyl group bonded to a vinyl group and/or a hydrolyzable silyl group bonded to the vinyl group via an alkylene group, and/or a compound having a hydrolyzable silyl group bonded to an ester or an amide of acrylic acid, methacrylic acid or the like. Examples thereof include vinyltrichlorosilane, vinyltris (beta-methoxyethoxy)silane, vinyltriethoxysilane, vinyltrimethoxysilane, gamma-methacryloxypropyltrimethoxysilane monovinylsilane and monoallylsilane.

Examples of unsaturated halogenated hydrocarbons include vinyl chloride and vinylidene chloride.

In a preferred embodiment, the blend may be grafted with maleic anhydride (MA), to produce the functionalized blend grafted maleic anhydride (Blend-g-MA), wherein the maleic anhydride may be covalently bonded to any one of the polymer chains of which the blend is comprised, and/or to any one of the components of which the blend is comprised. The anhydride functionality grafted onto the blend may remain as an anhydride, may be oxidized into acid functional groups, and/or may be further reacted by processes known in the art to induce other functional groups such as amides, amines, esters, and the like.

The grafting is usually accomplished by combining the component to be modified (such as a blend of POA and tackifer) with a free radical initiator and the monomer to be grafted (such as maleic acid or maleic anhydride).

Preferable examples of free radical initiators useful herein include organic peroxides such as benzoyl peroxide, methyl ethyl ketone peroxide, cyclohexanone peroxide, t-butylperoxyisopropyl carbonate, di-ti-butyl perphthalate, 2,5-dimethyl-2,5-di(t-butylperoxy)hexene (Lupersol 101, ElfAtochem), 2,5-dimethyl-2,5-di(t-butylperoxy)hexene-3, di-t-butyl peroxide, cumene hydroperoxide, t-butyl hydroperoxide, dilauryl peroxide and dicumyl peroxide.

The functionalized blend of the present invention may thus be obtained by heating the above-mentioned blend and the above-mentioned radical polymerizable unsaturated compound in the presence of the radical initiator at, near, or above a decomposition temperature of the radical initiator.

In some embodiments, no particular restriction need be put on the amount of the unsaturated compound to be used, accordingly, conventional conditions for functionalizing, for example, a polypropylene, can be utilized as is. Since in some cases the efficiency of the copolymerization is relatively high, the amount of the unsaturated compound may be small. In an embodiment, the amount of the unsaturated compound to be incorporated into the blend is preferably from about 0.001 to 50 wt % functional group (such as maleic anhydride) with respect to the total amount of the functionalized blend present.

The radical initiator is preferably used in a ratio of from 0.00001 to 10 wt %, based on the weight of the unsaturated compound. The heating temperature depends upon whether or not the reaction is carried out in the presence of a solvent, but it is usually from about 50° C. to 350° C. When the heating temperature is less than 50° C., the reaction may be slow and thus efficiency may be low. When it is more than 350° C., decomposition of the blend components may occur. The functionalized blend may be functionalized with a functional group utilizing a solvent based functionalization process and/or utilizing a melt based functionalization process without a solvent.

In the solvent based process, the reaction may be carried out using the blend in the form of a solution or a slurry having a concentration of from 0.1 to 50 wt % in the presence of a halogenated hydrocarbon compound having 2 to 20 carbon atoms, an aromatic compound, a halogenated aromatic compound, an alkyl substituted aromatic hydrocarbon, a cyclic hydrocarbon, and/or a hydrocarbon compound having 6 to 20 carbon atoms which is stable to the radicals.

In the functionalization process utilizing a melt based functionalization process without a solvent, the reaction may be carried out in the absence of the solvent in a device such as an extruder which can sufficiently produce physical contact between what may be a highly viscous components. In the latter case, the reaction is usually effected at a relatively high temperature, as compared with the reaction in the state of the solution.

Other methods for functionalizing the blend that may be used herein include, but are not limited to, selective oxidation, ozonolysis, epoxidation, and the like, both in solution or slurry (i.e., with a solvent), or in a melt (i.e., without a solvent).

In the present invention, the graft polymerization (grafting of the blend) can be carried out in an aqueous medium. In this case a dispersant can be used, and examples of the dispersant include a saponified polyvinyl acetate, modified celluloses such as hydroxyethyl cellulose and hydroxypropyl cellulose, and compounds containing an OH group such as polyacrylic acid and polymethacrylic acid. In addition, compounds which are used in a usual aqueous suspension polymerization can also be widely employed.

The reaction may be carried out by suspending the blend, the water-insoluble radical polymerizable monomer, the water-insoluble radical initiator and/or the dispersant in water, and then heating the mixture. Here, a ratio of water to the sum of the radical polymerizable monomer (i.e., the unsaturated compound) and the blend is preferably 1:0.1 to 1:200, more preferably 1:1 to 1:100. The heating temperature is such that the half-life of the radical initiator is preferably from 0.1 to 100 hours, more preferably from 0.2 to 10 hours, and it is preferably from 300 to 200° C., more preferably from 40° to 150° C. In the heating step, it is preferred that the mixture is stirred sufficiently so as to become in a suspension state. In this way, the grafted blend (i.e., the functionalized blend) may be obtained in granular form.

A weight ratio of the water-insoluble monomer to the blend may preferably be from 1:01 to 1:10000, and a weight ratio of the radical initiator to the water-insoluble monomer may be from 0.00001 to 0.1. The ratio of the water-insoluble monomer in the functionalized blend depends upon its use, but the amount of the monomer may be from 0.1 to 200% by weight based on the weight of the blend present in the grafted blend.

The obtained functionalized blend preferably contains a desired amount of radical polymerizable unsaturated compound units in the range of from 0.1 to 50 wt % based on the weight of the blend in compliance with its use or application. When the content of the radical polymerizable unsaturated compound units is in excess of 50 wt %, the particular functionalized blend may not exert intrinsic physical properties, and when it is less than the above-mentioned lower limit, the desired physical properties of the grafted blend may not be obtained.

Furthermore, a compatibilizing effect within the inventive composition obtained by functionalizing the blend may be influenced by the level of grafting. In an embodiment, the blend may be functionalized (e.g., grafted) to include about 0.001 wt % or greater of the unsaturated compound attached and/or incorporated into the components of the blend. The blend may also be functionalized grafted to a higher degree. The level of functionalization (e.g., the grafting level) may be less than about 50 wt %, preferably less than about 45 wt %, preferably less than about 40 wt %, preferably less than about 35 wt %, preferably less than about 30 wt %, preferably less than about 25 wt %, preferably less than about 20 wt %, preferably less than about 15 wt %, preferably less than about 10 wt %, preferably less than about 9 wt %, preferably less than about 8 wt %, preferably less than about 7 wt %, preferably less than about 6 wt %, preferably less than about 5 wt %, preferably less than about 4 wt %, preferably less than about 3 wt %, preferably less than about 2 wt %, preferably less than about 1.5 wt %, preferably less than about 1 wt %, preferably less than about 0.5 wt %, based on the total amount of the functionalized blend present. In a preferred embodiment the level of functionalization is preferably from 0.01 to 15 weight %, preferably 0.05 to 10 weight %, more preferably 1 to 5 weight %, based upon the weight of the composition that was functionalized. In another preferred embodiment the POA comprises a polymer comprising at least 85 weight % propylene and up to 50 weight % tackifier and the level of functionalization of the combination of the polypropylene and the tackifier is preferably from 0.01 to 15 weight %, preferably 0.05 to 10 weight %, more preferably 1 to 5 weight %, based upon the weight of the polypropylene and the tackifier. In a preferred embodiment, the functional group is maleic anhydride.

The functionalized blend may subsequently mixed or blended with (i.e., in combination with, an admixture of, and the like) an olefin homopolymer or copolymer containing no graft component, a different graft component, or a similar graft component at a different level of inclusion, other additives, and/or the like, to achieve a final adhesive composition with a desired level of adhesion for a particular end use or process as described above.

A mixing ratio between the functionalized blend and other additives may be such that the radical polymerizable unsaturated compound units, preferably the unsaturated anhydride and/or carboxylic acid units in the functionalized blend, are present in an amount of 0.001 to 50% by weight, based on the total weight of the functionalized blend. In a preferred embodiment, blend is functionalized with maleic anhydride, and the carboxylic acid units in the functionalized blend may be about 0.01 wt % or greater, preferably about 0.1 wt % or greater, preferably about 0.5 wt % or greater, preferably about 1 wt % or greater, preferably about 5 wt % or greater, preferably about 10 wt % or greater, preferably about 15 wt % or greater, preferably about 20 wt % or greater, about 30 wt % or greater, preferably about 40 wt % or greater, based on the total weight of the functionalized blend. In addition, the carboxylic acid units in the functionalize blend may be about 45 wt % or less, preferably about 35 wt % or less, preferably about 25 wt % or less, preferably about wt % or less, preferably about 15 wt % or less, preferably about 10 wt % or less, preferably about 5 wt % or less, preferably about 1 wt % or less, based on the total weight of the functionalized blend.

In the process utilized for producing the functionalized blend, no particular restriction need be put on a mixing manner, accordingly, the raw materials may be mixed uniformly by means of a Henschel mixer or the like and then may be melted, mixed and molded into pellets by an extruder or the like. It is also possible to utilize a Brabender mixer by which mixing and melting are carried out simultaneously, and after the melting, the material can be directly molded into films, sheets, or the like.

Formation of the Composition and/or the Adhesive Composition

When two or more components are present, the blend of the present invention may be produced by combining the first component comprising the POA polymer with the second component comprising the tackifier, and/or other additives, followed by functionalizing the blend, which may then be further blended with additional additives, additional POA polymer, other polymers, additional tackifier or combinations thereof. No particular restriction need be put on a mixing manner, thus the raw materials may be mixed uniformly by means of a Henschel mixer or the like and then may be melted, mixed and molded into pellets by an extruder or the like. It is also possible to utilize a Brabender mixer by which mixing and melting are carried out simultaneously, and after the melting, the material can be directed molded into films, sheets or the like. Thus, the blends described herein may be formed using conventional techniques known in the art such that blending may be accomplished using one or more static mixers, in-line mixers, elbows, orifices, baffles, or any combination thereof.

Use of the Adhesive Composition

The composition of this invention or formulations comprising the inventive composition may be applied directly to a substrate or may be sprayed thereon. The composition may be molten or heated to a semisolid state prior to or during application. Spraying is defined to include atomizing, such as producing an even dot pattern, spiral spraying such as Nordson Controlled Fiberization or oscillating a stretched filament like may be done in the ITW Dynafiber/Omega heads or Summit technology from Nordson.

The blends of this invention may also be melt blown. Melt blown techniques are defined to include the methods described in U.S. Pat. No. 5,145,689 or any process where air streams are used to break up filaments of the extrudate and then used to deposit the broken filaments on a substrate. Preferred melt blown techniques include processes that use air to spin hot melt adhesive fibers and convey them onto a substrate for bonding. Fibers sizes can easily be controlled from 20-200 microns by changing the melt to air ratio. Few, preferably no, stray fibers are generated due to the inherent stability of adhesive melt blown applicators. Under UV light the bonding appears as a regular, smooth, stretched dot pattern. Atomization is a process that uses air to atomize hot melt adhesive into very small dots and convey them onto a substrate for bonding.

Lamination Melt Coating

The adhesive compositions of this invention may be used in any adhesive application, including but not limited to, disposables, packaging, laminates, pressure sensitive adhesives, tapes labels, wood binding, paper binding, non-wovens, road marking, reflective coatings, tie layers, adhesion promoters, and the like.

In a preferred embodiment the adhesives of this invention can be used for disposable diaper and napkin chassis construction, elastic attachment in disposable goods converting, packaging, labeling, bookbinding, woodworking, and other assembly applications. Particularly preferred applications include: baby diaper leg elastic, diaper frontal tape, diaper standing leg cuff, diaper chassis construction, diaper core stabilization, diaper liquid transfer layer, diaper outer cover lamination, diaper elastic cuff lamination, feminine napkin core stabilization, feminine napkin adhesive strip, industrial filtration bonding, industrial filter material lamination, filter mask lamination, surgical gown lamination, surgical drape lamination, and perishable products packaging.

On or more of the embodiments of the adhesive compositions described above may be applied to any substrate. Preferred substrates include wood, paper, cardboard, plastic, thermoplastic, rubber, metal, metal foil (such as aluminum foil and tin foil), metallized surfaces, cloth, non-wovens (particularly polypropylene spun bonded fibers or non-wovens), spunbonded fibers, cardboard, stone, plaster, glass (including silicon oxide ($SiO_x$) coatings applied by evaporating silicon oxide onto a film surface), foam, rock, ceramics, films, polymer foams (such as polyurethane foam), substrates coated with inks, dyes, pigments, PVDC and the like or combinations thereof.

Additional preferred substrates include polyethylene, polypropylene, polyacrylates, acrylics, polyethylene terephthalate, or any of the polymers listed above as suitable for blends.

Any of the above substrates, and/or the polymers of this invention, may be corona discharge treated, flame treated, electron beam irradiated, gamma irradiated, microwaved, or silanized.

The adhesives produced herein, when coated in some fashion between two adherends, preferably perform such that the materials are held together in a sufficient fashion compared to a standard specification or a standard adhesive similarly constructed. In so doing, the inventive composition may be utilized as a surface primer, as a tie layer, as an adhesion promoter, as a hot melt adhesive, or the like.

The adhesive compositions of this invention may be used in any adhesive application described in WO 97/33921 in combination with the polymers described therein or in place of the polymers described therein.

The adhesive compositions of this invention, alone or in combination with other polymers and or additives, may also be used to form hook and loop fasteners as described in WO 02/35956.

Tie Layer Applications

When utilized as a tie layer, adhesion promoter, as a paint primer, as a surface primer, or the like, the composition of the present invention has high adhesion to both a polar substrate and a non-polar substrate. Adhesion may be explained per an adhesion model, wherein for one polymer bonded to the other, the joint separation force P demands the transfer of the mechanical stress through the interface. The effectiveness of this transfer depends on the molecular interactions across the interface, $P_o$. With a nonzero value of $P_o$, P can further be improved by the optimization of the bonding term B, and the debonding term D, through the adhesion model:

$$P = P_o BD$$

The joint strength is thus governed by the fracture mechanics of the interfacial system of the thermodynamic work of adhesion from producing newly debonded surfaces by rupture. Due to the multiplicative nature of this adhesion model, a two-fold increase in $P_o$ will result in a two-fold increase in adhesion if B and D remain constant. This is the major reason why even if the bulk properties of two adhesive compositions appear similar, a change in the interfacial properties of the adhesives will affect adhesion, as is shown in the Examples below.

In another embodiment the functionalized blends of this invention are heat stable, by which is meant that the Gardner color of the composition (as determined by ASTM D-1544-68) that has been heat aged (e.g., maintained) at or 180° C. for 48 hours, does not change by more than 7 Gardner units when compared to the Gardner color of the initial composition. Preferably, the Gardner color of the composition after heating above its melting point for 48 hours does not change by more than 6, more preferably 5, still more preferably 4, still more preferably 3, still more preferably 2, still more preferably 1 Gardner color unit, as compared to the initial composition prior to being heated.

It has been discovered that free acid groups present in the composition may result in reduced heat stability. Accordingly, in a preferred embodiment, the amount of free acid groups present in the blend is less than about 1000 ppm, more preferably less than about 500 ppm, still more preferably less than about 100 ppm, based on the total weight of the blend. In yet another preferred embodiment, the composition is essentially free from phosphites, preferably the phosphites are present at 100 ppm or less.

In another embodiment this invention relates to:
1. An adhesive composition comprising: a blend functionalized with a functional group, wherein the blend comprises a C3 to C40 olefin polymer and at least one additive, wherein the C3 to C40 olefin polymer comprises at least 50 mol % of one or more C3 to C40 olefins and has:
   a) a Dot T-Peel of 1 Newton or more on Kraft paper;
   b) an Mw of 10,000 to 100,000; and
   c) a branching index (g') of 0.98 or less measured at the Mz of the polymer when the polymer has an Mw of 10,000 to 60,000, or ranching index (g') of 0.95 or less measured at the Mz of the polymer when the polymer has an Mw of 10,000 to 100,000.
2. The adhesive composition of paragraph 1, wherein prior to blend functionalization, the C3 to C40 olefin polymer has:
   a) a Dot T-Peel of 1 Newton or more on Kraft paper;
   b) a branching index (g') of 0.98 or less measured at the Mz of the polymer;
   c) a Mw of 10,000 to 60,000; and
   d) a heat of fusion of 1 to 50 J/g.
3. The adhesive composition of paragraph 1 or 2, wherein prior to blend functionalization, the C3 to C40 olefin polymer is a homopolypropylene or a copolymer of propylene and up to 5 mole % ethylene having:
   a) an isotactic run length of 1 to 30,
   b) percent of r dyad of greater than 20%, and
   c) a heat of fusion of between 1 and 70 J/g.
4. The adhesive composition of any of paragraphs 1-3, wherein prior to blend functionalization, the C3 to C40 olefin polymer comprises propylene and less than 15 mole % of ethylene.
5. The adhesive composition of any of paragraphs 1-4, wherein prior to blend functionalization, the C3 to C40 olefin polymer has a melt viscosity of 7000 Pa·sec or less at 190° C.
6. The adhesive composition of any of paragraphs 1-5, wherein prior to blend functionalization, the C3 to C40 olefin polymer has a melt viscosity of 5000 mPa·sec or less at 190° C.
7. The adhesive composition of any of paragraphs 1-6, wherein prior to blend functionalization, the C3 to C40 olefin polymer has a melt viscosity of between 250 and 6000 mPa·sec at 190° C.
8. The adhesive composition of any of paragraphs 1-7, wherein prior to blend functionalization, the C3 to C40 olefin polymer has a melt viscosity of between 500 and 3000 mPa·sec at 190° C.
9. The adhesive composition of any of paragraphs 1-8, wherein prior to blend functionalization, the C3 to C40 olefin polymer has a Tg of 0° C. or less.
10. The adhesive composition of any of paragraphs 1-9, wherein prior to blend functionalization, the C3 to C40 olefin polymer has a Tg of −10° C. or less.
11. The adhesive composition of any of paragraphs 1-10, wherein prior to blend functionalization, the C3 to C40 olefin polymer has an Mw of 10,000 to 75,000 and a branching index of 0.6 or less.
12. The adhesive composition of any of paragraphs 1-11, wherein prior to blend functionalization, the C3 to C40 olefin polymer has an Mw of 10,000 to 50,000 and a branching index of 0.7 or less.
13. The adhesive composition of any of paragraphs 1-12, wherein prior to blend functionalization, the C3 to C40 olefin polymer has an Mw of 10,000 to 30,000 and a branching index of 0.98 or less.
14. The adhesive composition of any of paragraphs 1-13, wherein prior to blend functionalization, the C3 to C40 olefin polymer has a branching index (g') of 0.90 or less measured at the Mz of the polymer.
15. The adhesive composition of any of paragraphs 1-14, wherein prior to blend functionalization, the SEC graph of the C3 to C40 olefin polymer is bi- or multi-modal.
16. The adhesive composition of any of paragraphs 1-15, wherein prior to blend functionalization, the C3 to C40 olefin polymer has an amorphous content of at least 50%.
17. The adhesive composition of any of paragraphs 1-16, wherein prior to blend functionalization, the C3 to C40 olefin polymer has:
   a) a peak melting point between 60 and 190° C.;
   b) a heat of fusion of 0 to 70 J/g; and
   c) a melt viscosity of 8000 mPa·sec or less at 190° C.
18. The adhesive composition of any of paragraphs 1-17, wherein prior to blend functionalization, the C3 to C40 olefin polymer has:
   a) a Tg of −10° C. or less;
   b) a melt viscosity between 2000 and 6000 mPa·sec;
   c) a molecular weight distribution (Mw/Mn) of at least 5; and
   d) a bi- or multi-modal SEC graph of the polymer.
19. The adhesive composition of any of paragraphs 1-18, wherein prior to blend functionalization, the C3 to C40 olefin polymer has a crystallinity of at least 5%.
20. The adhesive composition of any of paragraphs 1-19, wherein prior to blend functionalization, the C3 to C40 olefin polymer has 20 wt % or more of hexane room temperature soluble fraction and 50 wt % or less of Soxhlet heptane insolubles.
21. The adhesive composition of any of paragraphs 1-20, wherein prior to blend functionalization, the C3 to C40 olefin polymer comprises less than 3.0 mole % ethylene.

22. The adhesive composition of any of paragraphs 1-21, wherein prior to blend functionalization, the C3 to C40 olefin polymer comprises less than 1.0 mole % ethylene.
23. The adhesive composition of any of paragraphs 1-22, wherein prior to blend functionalization, the C3 to C40 olefin polymer has an Mz/Mn of 2 to 200.
24. The adhesive composition of any of paragraphs 1-23, wherein prior to blend functionalization, the C3 to C40 olefin polymer has an Mz of 15,000 to 500,000.
25. The adhesive composition of any of paragraphs 1-24, wherein prior to blend functionalization, the C3 to C40 olefin polymer has a SAFT of 50 to 150° C.
26. The adhesive composition of any of paragraphs 1-25, wherein prior to blend functionalization, the C3 to C40 olefin polymer has a Shore A hardness of 95 or less.
27. The adhesive composition of any of paragraphs 1-26, wherein prior to blend functionalization, the C3 to C40 olefin polymer has an Mw/Mn of 2 to 75.
28. The adhesive composition of any of paragraphs 1-27, wherein the at least one additive includes a tackifier, a filler, an antioxidant, an adjuvant, an adhesion promoter, an oil, a plasticizer, a block, an antiblock, a pigment, a processing aid, a UV stabilizer, a neutralizer, a lubricant, a surfactant, a nucleating agent, a coupling agent, a color master batch, a polymer having a Mn below 5000, a functionalized wax, a polar wax, a non-polar wax, a polypropylene wax, a polyethylene wax, a wax modifier, an elastomer, an impact copolymer, an ester polymer, a crosslinking agent, a hydrocarbon resin, a diolefin, or a combination thereof.
29. The adhesive composition of any of paragraphs 1-28, wherein prior to functionalization, the blend comprises about 0.1 to about 50 wt % of the at least one additive.
30. The adhesive composition of any of paragraphs 1-29 wherein the additive comprises one or more tackifiers.
31. The adhesive composition of claim 30 wherein the tackifier is present at 5 to 50 weight %.
32. The adhesive composition of any of paragraphs 1-31, wherein prior to blend functionalization, the blend further comprises an olefin homopolymer that is not functionalized.
33. The adhesive composition of any of paragraphs 1-32, wherein prior to blend functionalization, the blend further comprises an olefin copolymer that is not functionalized.
34 The adhesive composition of any of paragraphs 1-33, having a set time of seconds or less.
35. The adhesive composition of any of paragraphs 1-34, wherein the unsaturated compound units are present within the functionalized blend at from 0.1 to 50 wt %.
36. The adhesive composition of any of paragraphs 1-35, wherein the blend is functionalized with a functional group utilizing radical copolymerization, and wherein the unsaturated compound is an unsaturated carboxylic acids, an ester of the unsaturated carboxylic acids, an acid anhydrides, a di-ester, a salt of an unsaturated carboxylic acid, an unsaturated amide, an unsaturated imide, an aromatic vinyl compound, a hydrolyzable unsaturated silane compound, an unsaturated halogenated hydrocarbon, or a combination thereof.
37. The adhesive composition of 36, wherein the blend is functionalized with a functional group utilizing radical copolymerization, and wherein the unsaturated compound is maleic anhydride, citraconic anhydride, 2-methyl maleic anhydride, 2-chloromaleic anhydride, 2,3-dimethylmaleic anhydride, bicyclo[2,2,1]-5-heptene-2,3-dicarboxylic anhydride, 4-methyl-4-cyclohexene-1,2-dicarboxylic anhydride, acrylic acid, methacrylic acid, maleic acid, fumaric acid, itaconic acid, citraconic acid, mesaconic acid, crotonic acid, bicyclo(2.2.2)oct-5-ene-2,3-dicarboxylic acid anhydride, 1,2,3,4,5,&g, lo-octahydronaphthalene-2,3-dicarboxylic acid anhydride, 2-oxa-1,3-diketospiro(4.4)non-7-ene, bicyclo(2.2.1)hept-5-ene-2,3-dicarboxylic acid anhydride, maleopimaric acid, tetrahydrophtalic anhydride, norborn-5-ene-2,3-dicarboxylic acid anhydride, nadic anhydride, methyl nadic anhydride, himic anhydride, methyl himic anhydride, x-methyl-bicyclo(2.2.1)hept-5-ene-2,3-dicarboxylic acid anhydride (XMNA), methyl acrylate, ethyl acrylate, butyl acrylate, methyl methacrylate, ethyl methacrylate, butyl methacrylate, vinyltrichlorosilane, vinyltris(beta-methoxyethoxy)silane, vinyltriethoxysilane, vinyltrimethoxysilane, gamma-methacryloxypropyltrimethoxysilane monovinylsilane, monoallylsilane, vinyl chloride, vinylidene chloride, or a combination thereof.
38. The adhesive composition of any of paragraphs 1-37, wherein the blend is functionalized with a functional group utilizing radical copolymerization, a peroxide, and wherein the unsaturated compound is maleic anhydride.
39. The adhesive composition of any of paragraphs 1-38, wherein the blend is functionalized with a functional group utilizing a solvent based functionalization process.
40. The adhesive composition of any of paragraphs 1-39, wherein the blend is functionalized with a functional group utilizing a melt based functionalization process without solvent.
41. The adhesive composition of any of paragraphs 1-40, wherein the blend is functionalized using selective oxidation, ozonolysis, epoxidation, or a combination thereof.
42. A process of making the adhesive composition of any of paragraphs 1-41, comprising providing the blend, and functionalizing the blend with a functional group.
43. The process of any of paragraphs 1-42, wherein the blend comprises a tackifier, and the unsaturated compound is maleic anhydride.
44. The adhesive of any of paragraphs 1-43 wherein the unsaturated compoud is maleic anhydride.
45. The adhesive of any of paragraphs 1-44 wherein the Gardner color of the adhesive composition (as determined by ASTM D-1544-68) that has been heat aged (e.g., maintained) at or 180° C. for 48 hours, does not change by more than 7 Gardner units when compared to the Gardner color of the initial composition.
46. The adhesive of any of paragraphs 1-45 wherein the amount of free acid groups present in the blend is less than about 1000 ppm.

EXAMPLES

Analytical Testing

Molecular weights (number average molecular weight (Mn), weight average molecular weight (Mw), and z-average molecular weight (Mz)) were determined using a Waters 150 Size Exclusion Chromatograph (SEC) equipped with a differential refractive index detector (DRI), an online low angle light scattering (LALLS) detector and a viscometer (VIS). The details of the detector calibrations have been described elsewhere [See T. Sun, P. Brant, R. R. Chance, and W. W. Graessley, *Macromolecules*, Volume 34, Number 19, 6812-6820, (2001)].

The SEC with three Polymer Laboratories PLgel 10 mm Mixed-B columns, a nominal flow rate 0.5 cm$^3$/min, and a nominal injection volume 300 microliters was common to both detector configurations. The various transfer lines, columns and differential refractometer (the DRI detector, used mainly to determine eluting solution concentrations) were contained in an oven maintained at 135° C.

The LALLS detector used was a model 2040 dual-angle light scattering photometer (Precision Detector Inc.). Its flow cell, located in the SEC oven, uses a 690 nm diode laser light source and collects scattered light at 15° and 90°. The 15° output was used herein. The signal generated was sent to a data acquisition board (National Instruments) that accumulates readings at a rate of 16 per second. The lowest four readings were averaged, and the proportional signal was sent to the SEC-LALLS-VIS computer. The LALLS detector was placed after the SEC columns, and before the viscometer.

The viscometer was a high temperature Model 150R (Viscotek Corporation) having four capillaries arranged in a Wheatstone bridge configuration with two pressure transducers. One transducer measures the total pressure drop across the detector, and the other, positioned between the two sides of the bridge, measures a differential pressure. The specific viscosity for the solution flowing through the viscometer was calculated from these outputs. The viscometer was inside the SEC oven, positioned after the LALLS detector but before the DRI detector.

Solvent for the SEC experiment was prepared by adding 6 grams of butylated hydroxy toluene (BHT) as an antioxidant to a 4 liter bottle of 1,2,4 Trichlorobenzene (TCB) (Aldrich Reagent grade) and waiting for the BHT to solubilize. The TCB mixture was then filtered through a 0.7 micron glass pre-filter and subsequently through a 0.1 micron Teflon filter. There was an additional online 0.7 micron glass pre-filter/0.22 micron Teflon filter assembly between the high pressure pump and SEC columns. The TCB was then degassed with an online degasser (Phenomenex, Model DG-4000) before entering the SEC.

Sample solutions were prepared by placing the dry polymer sample in a glass container, adding the desired amount of TCB, then heating the mixture at 160° C. with continuous agitation for about 2 hours. All quantities were measured gravimetrically. The TCB densities used to express the polymer concentration in mass/volume units were 1.463 g/ml at room temperature and 1.324 g/ml at 135° C. The injection concentration ranged from 1.0 to 2.0 mg/ml, with lower concentrations being used for higher molecular weight samples.

Prior to running each sample the DRI detector and the injector were purged. Flow rate in the apparatus was then increased to 0.5 ml/minute, and the DRI was allowed to stabilize for 8-9 hours before injecting the first sample. The argon ion laser was turned on 1 to 1.5 hours before running samples by running the laser in idle mode for 20-30 minutes and then switching to full power in light regulation mode.

The branching index was measured using SEC with an on-line viscometer (SEC-VIS) and are reported as g' at each molecular weight in the SEC trace. The branching index g' is defined as:

$$g' = \frac{\eta_b}{\eta_l}$$

where $\eta_b$ is the intrinsic viscosity of the branched polymer and $\eta_l$ is the intrinsic viscosity of a linear polymer of the same viscosity-averaged molecular weight ($M_v$) as the branched polymer. $\eta_l = KM_v^\alpha$, K and $\alpha$ were measured values for linear polymers and should be obtained on the same SEC-DRI-LS-VIS instrument as the one used for branching index measurement. For polypropylene samples presented in this invention, K=0.0002288 and $\alpha$=0.705 were used. The SEC-DRI-LS-VIS method obviates the need to correct for polydispersities, since the intrinsic viscosity and the molecular weight were measured at individual elution volumes, which arguably contain narrowly dispersed polymer. Linear polymers selected as standards for comparison were of the same viscosity average molecular weight, monomer content and composition distribution. Linear character for polymer containing C2 to C10 monomers is confirmed by Carbon-13 NMR according to Randall (Rev. Macromol. Chem. Phys., C29 (2&3), p. 285-297). Linear character for C11 and above monomers was confirmed by GPC analysis using a MALLS detector. For example, for a copolymer of propylene, the NMR should not indicate branching greater than that of the co-monomer (i.e. if the comonomer is butene, branches of greater than two carbons should not be present). For a homopolymer of propylene, the GPC should not show branches of more than one carbon atom. When a linear standard was desired for a polymer where the comonomer is C9 or more, protocols described by T. Sun, P. Brant, R. R. Chance, and W. W. Graessley, *Macromolecules*, Volume 34, Number 19, 6812-6820, (2001) were used in determining standards. In the case of syndiotactic polymers, the standard was selected to have a comparable amount of syndiotacticity as measured by Carbon 13 NMR.

Peak melting point (Tm), peak crystallization temperature (Tc), heat of fusion and crystallinity were determined using ASTM E 794-85. Differential scanning calorimetric (DSC) data was obtained using a TA Instruments model 2920. e.g., samples weighing approximately 7-10 mg were sealed in aluminum sample pans. The DSC data was recorded by first cooling the sample to −50° C. and then gradually heating it to 200° C. at a rate of 10° C./minute. The sample was kept at 200° C. for 5 minutes before a second cooling-heating cycle was applied.

Both the first and second cycle thermal events were recorded. Areas under the curves were measured and used to determine the heat of fusion and the degree of crystallinity. The percent crystallinity is calculated using the formula, [area under the curve (Joules/gram)/B (Joules/gram)]*100, where B is the heat of fusion for the homopolymer of the major monomer component. These values for B were obtained from the Polymer Handbook, Fourth Edition, published by John Wiley and Sons, New York 1999. A value of 189 J/g (B) was used as the heat of fusion for 100% crystalline polypropylene. For polymers displaying multiple melting or crystallization peaks, the highest melting peak was taken as peak melting point, and the highest crystallization peak was taken as peak crystallization temperature. The glass transition temperature (Tg) was measured by ASTM E 1356 using a TA Instruments model 2920.

Melt Viscosity was determined according to ASTM D-3236, which is also referred to herein as "viscosity" and/or "Brookfield viscosity". Melt viscosity profiles were measured at a temperature from 120° C. to 190° C. using a Brookfield Thermosel viscometer and a number 27 spindle unless otherwise noted.

Adhesive Testing

Adhesive test specimens were created by bonding the substrates together with a portion (e.g., a dot) of molten adhesive and compressing the bond with a 500-gram weight until cooled to room temperature (i.e., about 25° C.). The dot size was controlled by the adhesive volume such that in most cases the compressed disk which formed gave a uniform circle just inside the dimensions of the substrates. Once a construct has been produced, it was be subjected to various insults in order to assess the effectiveness of the bond.

Once a bond fails to a paper substrate the effectiveness of the bond was quantified at a particular temperature by estimating the area of the adhesive dot that retained paper fibers as the construct failed along the bond line. This estimate is referred to herein as the percent substrate fiber tear. An example of good fiber, after conditioning a sample for 15 hours at −12° C. and attempting to destroy the bond, would be an estimate of 80-100% substrate fiber tear. It is likely that 0% substrate fiber tear under those conditions would signal a loss of adhesion.

Substrate fiber tear: The specimens were prepared using the same procedure as that described above. For low temperature fiber tear test, the bond specimens were placed in a freezer or refrigerator to obtain the desired test temperature. For substrate fiber tear at room temperature, the specimens were aged at ambient conditions. The bonds were separated by hand and a determination made as to the type of failure observed. The amount of substrate fiber tear is expressed herein as a percentage.

Dot T-Peel was determined according to ASTM D 1876, except that the specimen was produced by combining two 1 inch by 3 inch (2.54 cm×7.62 cm) substrate cut outs with a dot of adhesive with a volume that, when compressed under a 500-gram weight occupied about 1 square inch of area (1 inch=2.54 cm). Once all the specimens were made, each were pulled apart in a side by side testing arrangement at a rate of 2 inches per minute by a machine that records the destructive force of the insult being applied. The maximum force achieved for each sample tested was recorded and averaged, thus producing the average maximum force which is reported as the Dot T-Peel.

Peel Strength (modified ASTM D1876): Substrates (1×3 inches (25×76 mm)) were heat sealed with adhesive film (5 mils (130 µm) thickness) at 135° C. for 1 to 2 seconds and 40 psi (0.28 MPa) pressure. Bond specimens were peeled back in a tensile tester at a constant crosshead speed of 2 in/min (51 mm/min). The average force required to peel the bond (5 specimens) apart was recorded.

Set time is defined for use herein as the time it takes for a compressed adhesive substrate construct to fasten together with enough adhesion so as to give substrate fiber tear when pulled apart, and thus the bond is sufficiently strong to remove the compression. The bond will likely still strengthen upon further cooling, however, it no longer requires compression. These set times were measured by placing a molten dot of adhesive on to a file folder substrate taped to a flat table. A file folder tab (1 inch by 3 inch (2.5 cm×7.6 cm)) was placed upon the dot 3 seconds later and compressed with a 500 gram weight. The weight was allowed to sit for about 0.5 to about 10 seconds. The construct thus formed was pulled apart to check for a bonding level sufficient to produce substrate fiber tear. The set time was recorded as the minimum time required for this bonding to occur. Standards of commercially available adhesives were used to calibrate this process.

SAFT (modified D4498) measures the ability of a bond to withstand an elevated temperature rising at 10° F. (5.5° C.)/15 min., under a constant force that pulls the bond in the shear mode. Bonds were formed in the manner described above on Kraft paper (1 inch by 3 inch (2.5 cm×7.6 cm)). The test specimens were suspended vertically in an oven at room temperature with a 500-gram load attached to the bottom. The temperatures at which the weight fell was recorded (when the occasional sample reached temperatures above the oven capacity >265° F. (129° C.) it was terminated and averaged in with the other samples at termination temperature).

Shore A hardness was measured according to ASTM D 2240. An air cooled dot of adhesive was subjected to the needle and the deflection was recorded from the scale.

Sample Preparation and Description

Two POA homopolypropylenes were produced according to the general procedures described in U.S. Ser. No. 10/868,951, filed Oct. 15, 2003. The catalysts used were di(p-triethylsilylphenyl) methylene(cyclopentadienyl)(3,8-di-t-butylfluorenyl)hafnium dimethyl and rac-dimethylsilyl bis(2-methyl-4-phenylindenyl) zirconium dimethyl the activator used was N,N-dimethylaniliniumtetrakis(pentafluorophenyl)borate. The polymerization was run at 131° C. in hexane.) The polymer properties are listed in Table A.

TABLE A

| | Mn (kg/mol) | Mw (kg/mol) | Mz (kg/mol) | Viscosity 190° C., (cps) | g' @ Mz | Tc (° C.) | Tm (° C.) | Tg (° C.) | Hf (J/g) |
|---|---|---|---|---|---|---|---|---|---|
| POA 9 | 15,000 | 33,000 | 63,000 | 917 | 0.88 | 91 | 133 | −7 | 39.4 |
| POA 13 | 13,000 | 31,000 | 60,000 | 1027 | 0.94 | 77 | 132 | | 31.8 |

The properties of blends of adhesives with and without functionalized components were evaluated along with the resultant product of an unfunctionalized blend of components which was then contacted with maleic anhydride and a peroxide to create a functionalized adhesive composition in a single step.

Comparative Sample 1 is the formulated adhesive comprising 86.1 wt % POA-9, 2 wt % maleated polypropylene (MAPP-40 which is a maleic modified polypropylene with acid number of 50, viscosity of 300 cps @190° C. available form Chusei, in Pasedena, Tex.) which was maleated prior to combination with the POA-9; 7 wt % Paraflint C80 wax (which is a Fischer Tropsch fractionated wax, available from Moore and Munger), 3.5 wt % Escorez 5300 tackifier (a hydrogenated aromatic modified resin produced from dicyclopentadiene feedstock, exhibiting a ring and ball softening point of about 99 to 110° C. available from ExxonMobil in Houston, Tex.), and 1.4 wt % phenolic antioxidant Irganox 1010 (Ciba-Geigy).

Comparative Sample 2 is the POA-13 polymer without the addition of any additives (e.g., without wax, tackifier, maleated PP, or the like).

Comparative Example 3 is a formulated adhesive blend comprising the above POA-13, Paraflint C80 wax and Escorez 5690 (a hydrogenated aromatic modified resin produced from dicyclopentadiene feedstock, exhibiting a ring and ball softening point of 130° C. available from ExxonMobil in Houston, Tex.).

Sample 4 is the formulated adhesive of Comparative Example 3, which was maleated as a blend as follows:

| | |
|---|---|
| POA-13 | 215.6 g |
| Escorez 5690 | 17.9 g |
| Paraflint C80 Wax | 17.2 g |
| Maleic anhydride | 4.9 g |
| Lupersol 101 (orgainic peroxide) | 2 g |

The functionalization of the blend was accomplished in a Brabender mixer preheated and maintained at 170° C. The POA-13 polymer, C80 wax, and tackifier E5690 were added to the Brabender mixer and thoroughly mixed until all the components were melted. The maleic anhydride was then added and mixed into the melted blend. The organic peroxide (Lupersol 101) was then added to the mixture and allowed to react in the mixing Brabender for about 10 minutes after all the organic peroxide had been added. The functionalized blend was then removed from the Brabender and allowed to cool. The blend was then applied to a cardboard substrate and tested for percent fiber tear.

Comparative Example 5 is Advantra 9250 (which is a commercial adhesive of ethylene/octene-1 metallocene polymers, tackifiers, and wax available from H. B. Fuller).

The data are as follows:

POA Polymer Functionalization with Ozone

A POA polymer (PP/DCPD) was prepared from propylene and dicyclopentadiene (DCPD) according to the general procedures described in U.S. Ser. No. 10/868,951, filed Oct. 15, 2003 to result in a propylene-DCPD copolymer having about 0.52 wt % DCPD, based on the total amount of the polymer. The catalysts used were dimethylsilyl(tetramethylcyclopentadienyl)(n-dodecylamido)titanium dimethyl and rac-dimethylsilyl bis(2-methyl-4-phenylindenyl) zirconium dimethyl. The activator used was N,N-dimethylaniliniumtetrakis(pentafluorophenyl)borate. The polymerization was run at 110° C. in hexane. The PP-DCPD copolymer was pressed into a smooth disk between sheets of silicone release paper utilizing a 500 g weight. The sample was then contacted with ozone in a mild ozone chamber for varying lengths of time to produce functionalized samples of the functionalized PP-DCPD sample was heat sealed to a paper substrate and a T-Peel test as described above was conducted. The PP-DCPD copolymer (Viscosity at 190° C. was 665 cp and shore hardness of 30) was exposed to ozone for 7 and 30 days. The Peak Peel Force (Instron) at zero days exposure was 3.1 lb/in, at 7 days was 3.5 lb/in, at 30 days was 3.8 lb/in. At zero days the failure mode was cohesive, at 7 days the failure mode was adhesive, and at 30 days the substrate failed.

| Sample | Comparative Sample 1 | Comparative Sample 2 | Comparative Sample 3 | Sample 4 | Comparative Sample 5 |
|---|---|---|---|---|---|
| POA-13 (wt %) | — | 100 | 82.5 | 82.5 | — |
| POA-9 (wt %) | 86.1 | — | — | — | — |
| MAPP (wt %) | 2 | — | — | — | — |
| Escorez 5690 (wt %) | — | — | 8.6 | 8.6 | — |
| Escorez 5300 (wt %) | 3.5 | | | | |
| Paraflint C80 Wax (wt %) | 7 | — | 8.6 | 8.6 | — |
| Irganox 1010 (wt %) | 1.4 | — | — | — | — |
| Advantra 9250 (wt %) | — | — | — | — | 100 |
| Analytical Testing Data | | | | | |
| Viscosity @ 190° C. (cp) | — | 1027 | 623 | 703 | 695 |
| Viscosity @ 177° C. (cp) | 915 | — | — | — | — |
| Set Time (sec.) | 2 | +6 | 2.5 | 4 | 1.5 |
| Shore A hardness/ 5 sec needle penetration | 89/83 | 86/72 | 84/68 | 85/71 | 89/87 |
| Adhesive Testing Data | | | | | |
| % Fiber Tear @ 25° C. | 98 | 0 | 91 | 100 | 100 |
| % Fiber Tear @ 2° C. | 91 | 0 | 40 | 95 | 98 |
| % Fiber Tear @ −11° C. | 75 | 0 | 45 | 41 | 97 |
| % Fiber Tear @ −35° C. | 80 | 30 | 45 | 65 | 88 |

As the data shows, the inventive composition provided an improved percent fiber tear with adequate set time when compared to the comparative examples without maleation, and with blend comprising polymers maleated prior to incorporation into the blend.

As the data shows, an improvement of adhesion in both samples is obtained upon exposure to ozone, which is thought to reflect an increase in subsequent functionalization of double bonds incorporated into the POA polymer to carbonyl/acid functional groups.

Accordingly, the inventive adhesive composition may produce improvements in adhesion over individual components alone. Furthermore, the data indicates the possibility of tailoring various adhesive properties via manipulation of the properties of blend components.

All documents described herein are incorporated by reference herein, including any priority documents and/or testing procedures. As is apparent from the foregoing general description and the specific embodiments, while forms of the invention have been illustrated and described, various modifications can be made without departing from the spirit and scope of the invention. Accordingly, it is not intended that the invention be limited thereby.

The invention claimed is:

1. An adhesive composition comprising:
   a blend functionalized with a functional group, wherein the blend comprises:
   a C3 to C40 olefin polymer and,
   at least one additive,
   wherein the C3 to C40 olefin polymer comprises at least 50 mol % of one or more C3 to C40 olefins and where the olefin polymer, prior to functionalization, has:
   a) a Dot T-Peel of 1 Newton or in ore on Kraft paper;
   b) an Mw of 10,000 to 100,000; and
   c) a branching index (g') of 0.98 or less measured at an Mz of the polymer when the polymer has an Mw of 10,000 to 60,000, or
   d) a branching index (g') of 0.95 or less measured at the Mz of the polymer when the polymer has an Mw of 10,000 to 100,000.

2. The adhesive composition of claim 1, wherein prior to blend functionalization, the C3 to C40 olefin polymer has:
   a) a Dot T-Peel of 1 Newton or more on Kraft paper;
   b) a branching index (g') of 0.98 or less measured at the Mz of the polymer;
   c) a Mw of 10,000 to 60,000; and
   d) a heat of fusion of 1 to 50 J/g.

3. The adhesive composition of claim 1, wherein prior to blend functionalization, the C3 to C40 olefm polymer is a homopolypropylene or a copolymer of propylene and up to 5 mole % ethylene having:
   a) an isotactic run length of 1 to 30,
   b) a percent of r dyed of greater than 20%, and
   c) a heat of fusion of between 1 and 70 J/g.

4. The adhesive composition of claim 1, wherein prior to blend functionalization, the C3 to C40 olefin polymer comprises propylene and less than 15 mole % of ethylene.

5. The adhesive composition of claim 1, wherein prior to blend functionalization, the C3 to C40 olefin polymer has a melt viscosity of 7000 Pa·sec or less at 190° C.

6. The adhesive composition of claim 1, wherein prior to blend functionalization, the C3 to C40 olefin polymer has a melt viscosity of 5000 mPa·sec or less at 190° C.

7. The adhesive composition of claim 1, wherein prior to blend functionalization, the C3 to C40 olefm polymer has a melt viscosity of between 250 and 6000 mPa·see at 190° C.

8. The adhesive composition of claim 1, wherein prior to blend functionalization, the C3 to C40 olefin polymer has a melt viscosity of between 500 and 3000 mPa·sec at 190° C.

9. The adhesive composition of claim 1, wherein prior to blend functionalization, the C3 to C40 olefin polymer has a Tg of 0° C. or less.

10. The adhesive composition of claim 1, wherein prior to blend functionalization, the C3 to C40 olefin polymer has a Tg of –10° C. or less.

11. The adhesive composition of claim 1, wherein prior to blend functionalization, the C3 to C40 olefin polymer has an Mw of 10,000 to 75,000 and a branching index of 0.6 or less.

12. The adhesive composition of claim 1, wherein prior to blend functionalization, the C3 to C40 olefin polymer has an Mw of 10,000 to 50,000 and a branching index of 0.7 or less.

13. The adhesive composition of claim 1, wherein prior to blend functionalization, the C3 to C40 olefin polymer has an Mw of 10,000 to 30,000 and a branching index of 0.98 or less.

14. The adhesive composition of claim 1, wherein prior to blend functionalization, the C3 to C40 olefin polymer has a branching index (g') of 0.90 or less measured at the Mz of the polymer.

15. The adhesive composition of claim 1, wherein prior to blend functionalization, the SEC graph of the C3 to C40 olefln polymer is bi- or multi-modal.

16. The adhesive composition of claim 1, wherein prior to blend functionalization, the C3 to C40 olefin polymer has an amorphous content of at least 50%.

17. The adhesive composition of claim 1, wherein prior to blend functionalization, the C3 to C40 olefin polymer has:
   a) a peak melting point between 60 and 190° C.;
   b) a heat of fusion of 0 to 70 J/g; and
   c) a melt viscosity of 8000 mPa·sec or less at 190° C.

18. The adhesive composition of claim 1, wherein prior to blend functionalization, the C3 to C40 olefin polymer has:
   a) a Tg of –10° C. or less;
   b) a melt viscosity between 2000 and 6000 mPa·sec;
   c) a molecular weight distribution (Mw/Mn) of at least 5; and
   d) a bi- or multi-modal SEC graph of the polymer.

19. The adhesive composition of claim 1, wherein prior to blend functionalization, the C3 to C40 olefin polymer has a crystallinity of at least 5%.

20. The adhesive composition of claim 1, wherein prior to blend functionalization, the C3 to C40 olefin polymer has 20 wt % or more of hexane room temperature soluble fraction and 50 wt % or less of Soxhlet heptane insolubles.

21. The adhesive composition of claim 1, wherein prior to blend functionalization, the C3 to C40 olefin polymer comprises less than 3.0 mole % ethylene.

22. The adhesive composition of claim 1, wherein prior to blend functionalization, the C3 to C40 olefin polymer comprises less than 1.0 mole % ethylene.

23. The adhesive composition of claim 1, wherein prior to blend functionalization, the C3 to C40 olefin polymer has an Mz/Mn of 2 to 200.

24. The adhesive composition of claim 1, wherein prior to blend functionalization, the C3 to C40 olefin polymer has an Mz of 15,000 to 500,000.

25. The adhesive composition of claim 1, wherein prior to blend functionalization, the C3 to C40 olefin polymer has a SAFT of 50 to 150° C.

26. The adhesive composition of claim 1, wherein prior to blend functionalization, the C3 to C40 olefin polymer has a Shore A hardness of 95 or less.

27. The adhesive composition of claim 1, wherein prior to blend functionalization, the C3 to C40 olefin polymer has an Mw/Mn of 2 to 75.

28. The adhesive composition of claim 1, wherein the at least one additive includes a tackifier, a filler, an antioxidant, an adjuvant, an adhesion promoter, an oil, a plasticizer, a block, an antiblock, a pigment, a processing aid, a UV stabilizer, a neutralizer, a lubricant, a surfactant, a nucleating agent, a coupling agent, a color master batch, a polymer having a Mn below 5000, a functionalized wax, a polar wax, a non-polar wax, a polypropylene wax, a polyethylene wax, a wax modifier, an elastomer, an impact copolymer, an ester polymer, a crosslinking agent, a hydrocarbon resin, a diolefin, or a combination thereof.

29. The adhesive composition of claim 28, wherein prior to functionalization, the blend comprises about 0.1 to about 50 wt % of the at least one additive.

30. The adhesive composition of claim 29 wherein the additive comprises one or more tackifiers.

31. The adhesive composition of claim 30 wherein the tackcifier is present at 5 to 50 weight %.

32. The adhesive composition of claim 1, wherein prior to blend functionalization, the blend further comprises an olefin homopolymer that is not functionalized.

33. The adhesive composition of claim 1, wherein prior to blend functionalization, the blend further comprises an olefin copolymer that is not functionalized.

34. The adhesive composition of claim 1, having a set time of 5 seconds or less.

35. The adhesive composition of claim 1, wherein the blend functionalized with functional group contains 0.1-5.0 wt % of unsaturated compound units.

36. The adhesive composition of claim 1, wherein the blend is functionalized with a functional group utilizing radical copolymerization, and wherein the blend functionalized with functional group contains an unsaturated compound, and the unsaturated compound is an unsaturated carboxylic acid, an ester of the unsaturated carboxylic acid, an acid anhydride, a di-ester, a salt of an unsaturated carboxylic acid, an unsaturated amide, an unsaturated imide, an aromatic vinyl compound, a hydrolyzable unsaturated silane compound, an unsaturated halogenated hydrocarbon, or a combination thereof.

37. The adhesive composition of claim 1, wherein the blend is functionalized with a functional group utilizing radical copolymerization, and wherein the blend functionalized with functional group contains an unsaturated compound, and the unsaturated compound is maleic anhydride, citraconic anhydride, 2-methyl maleic anhydride, 2-chloromaleic anhydride, 2,3-dimethylmaleic anhydride, bicyclo[2,2,1]-5-heptene-2,3-dicarboxylic anhydride, 4-methyl-4-cyclohexene-1,2-dicarboxylic anhydride, acrylic acid, methacrylic acid, maleic acid, fumaric acid, itaconic acid, citraconic acid, mesaconic acid, crotonic acid, bicyclo(2.2.2)oct-5-ene-2,3-dicarboxylic acid anhydride, 1,2,3,4,5,&g, lo-octahydronaphthalene-2,3-dicarboxylic acid anhydride, 2-oxa-1,3-diketospiro(4,4)non-7-ene, maleopimaric acid, tetrahydrophtalic anhydride, norbom-5-ene-2,3-dicarboxylic acid anhydride, nadic anhydride, methyl nadic anhydride, himic anhydride, methyl himic anhydride, x-methyl-bicyclo(2.2.1)hept-5-ene-2,3-dicarboxylic acid anhydride (XMNA), methyl acrylate, ethyl acrylate, butyl acrylate, methyl methacrylate, ethyl methacrylate, butyl methacrylate, vinyltrichlorosilane, vinyltris(beta-methoxyethoxy)silane, vinyltriethoxysilane, vinyltrimethoxysilane, gamma-methacryloxypropyltrimethoxysilane monovinylsilane, monoallylsilane, vinyl chloride, vinylidene chloride, or a combination thereof.

38. The adhesive composition of claim 1, wherein the blend is functionalized with a functional group utilizing radical copolymerization, a peroxide, and wherein the blend functionalized with functional group contains an unsaturated compound, that is maleic anhydride.

39. The adhesive composition of claim 1, wherein the blend is functionalized with a functional group utilizing a solvent based functionalization process.

40. The adhesive composition of claim 1, wherein the blend is functionalized with a functional group utilizing a melt based functionalization process without solvent.

41. The adhesive composition of claim 1, wherein the blend is functionalized using selective oxidation, ozonolysis, epoxidation, or a combination thereof.

42. A process of making the adhesive composition of claim 1, comprising providing the blend, and functionalizing the blend with a functional group.

43. The process of claim 42, wherein the blend comprises a tackifier, and the blend functionalized with functional group contains an unsaturated compound, that is maleic anhydride.

44. The adhesive of claim 1 wherein the blend functionalized with functional group contains an unsaturated compound, that is maleic anhydride.

* * * * *